(12) United States Patent
Vinayakumar et al.

(10) Patent No.: US 11,917,033 B2
(45) Date of Patent: *Feb. 27, 2024

(54) TECHNIQUES FOR MANAGING DISTRIBUTED COMPUTING COMPONENTS

(71) Applicant: Oracle International Corporation, Redwood Shores, CA (US)

(72) Inventors: Shreyas Vinayakumar, Santa Clara, CA (US); Banashankar Veerad, Milpitas, CA (US); Aleks Seovic, Lutz, FL (US); Kanishka Sharad Joshi, San Jose, CA (US); Saurabh Agarwal, Fremont, CA (US); Jinsu Choi, Seoul (KR); Meghal Bharat Gosalia, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,529

(22) Filed: Aug. 19, 2022

(65) Prior Publication Data
US 2022/0394107 A1 Dec. 8, 2022

Related U.S. Application Data

(63) Continuation of application No. 17/382,262, filed on Jul. 21, 2021, now Pat. No. 11,457,092.
(Continued)

(51) Int. Cl.
*H04L 67/568* (2022.01)
*G06F 9/50* (2006.01)
(Continued)

(52) U.S. Cl.
CPC .......... *H04L 67/568* (2022.05); *G06F 9/5083* (2013.01); *G06F 11/3006* (2013.01);
(Continued)

(58) Field of Classification Search
CPC ............... H04L 67/568; H04L 67/1001; H04L 16/2379; H04L 11/3005; H04L 11/3409
(Continued)

(56) References Cited

U.S. PATENT DOCUMENTS 10,616,078 B1   4/2020   Thomas
11,457,092 B2   9/2022   Vinayakumar et al.
(Continued)

OTHER PUBLICATIONS

U.S. Appl. No. 17/382,262, Non-Final Office Action dated Jun. 3, 2022, 14 pages.
(Continued)

*Primary Examiner* — Zi Ye
(74) *Attorney, Agent, or Firm* — Kilpatrick Townsend & Stockton LLP

(57) ABSTRACT

Techniques discussed herein are directed to identifying health assessment data of a set of computing instances of a distributed computing system. The health assessment data may be collected from the computing instances and stored in a first distributed cache. When a request for health assessment data for one or more computing instances is received, the health assessment data may be retrieved from the first distributed cache, provided to the requesting entity, and stored in a second distributed cache. A subsequent request may cause new health assessment data to be retrieved from the first distributed cache and compared to the stored data of the second distributed cache. Changes in the health assessment data may be identified and data indicating those changes may be provided in response to the subsequent request. One or more remedial actions may be performed in response to the health assessment data obtained.

17 Claims, 16 Drawing Sheets

Related U.S. Application Data

(60) Provisional application No. 63/140,014, filed on Jan. 21, 2021.

(51) Int. Cl.
*G06F 16/23* (2019.01)
*G06F 11/30* (2006.01)
*G06F 11/34* (2006.01)
*H04L 67/1001* (2022.01)

(52) U.S. Cl.
CPC ...... *G06F 11/3409* (2013.01); *G06F 16/2379* (2019.01); *H04L 67/1001* (2022.05); *G06F 2209/505* (2013.01)

(58) Field of Classification Search
USPC .......................................... 709/213
See application file for complete search history.

(56) References Cited

U.S. PATENT DOCUMENTS

| | | | |
|---|---|---|---|
| 2004/0267691 A1* | 12/2004 | Vasudeva | G06F 11/3409 |
| 2011/0098973 A1* | 4/2011 | Seidman | G06F 11/3466 |
| | | | 702/179 |
| 2012/0079497 A1* | 3/2012 | Gangemi | G06F 9/5011 |
| | | | 718/104 |
| 2012/0084419 A1* | 4/2012 | Kannan | H04L 67/1001 |
| | | | 709/227 |
| 2013/0060933 A1 | 3/2013 | Tung et al. | |

OTHER PUBLICATIONS

U.S. Appl. No. 17/382,262, Notice of Allowance dated Jul. 7, 2022, 7 pages.

* cited by examiner

TECHNIQUES FOR MANAGING DISTRIBUTED COMPUTING COMPONENTS

CROSS-REFERENCED APPLICATIONS

This application is a continuation of U.S. patent application Ser. No. 17/382,262, entitled "Techniques for Managing Distributed Computing Components," filed Jul. 21, 2021, which claims priority to provisional application No. 63/140,014, entitled "Techniques for Managing Distributed Computing Components," filed Jan. 21, 2021, the entirety of which is incorporated by reference for all purposes.

BACKGROUND

Distributed computing systems have become increasingly common. These systems may include a computing cluster of connected nodes (e.g., computers, servers, virtual machines, etc.) that work together in a coordinated fashion to handle various requests (e.g., request to store and/or retrieve data in a system that maintains a database). These computing nodes can be utilized by any suitable number of tenants. As the number of tasks increases or decreases, the number of connected nodes may be increased or decreased accordingly. Conversely, if the number of tasks increases, the number of nodes may be less than what is needed to efficiently handle the pending tasks, thus introducing greater latency for performing the pending tasks. One or more load balancers may be utilized to manage the execution of tasks by the connected nodes. Understanding the health of the connected nodes is important to efficiently execute the tasks (e.g., create, read, update, and delete operations).

BRIEF DESCRIPTION OF THE DRAWINGS

Various embodiments in accordance with the present disclosure will be described with reference to the drawings, in which.

DETAILED DESCRIPTION

Figure 1:
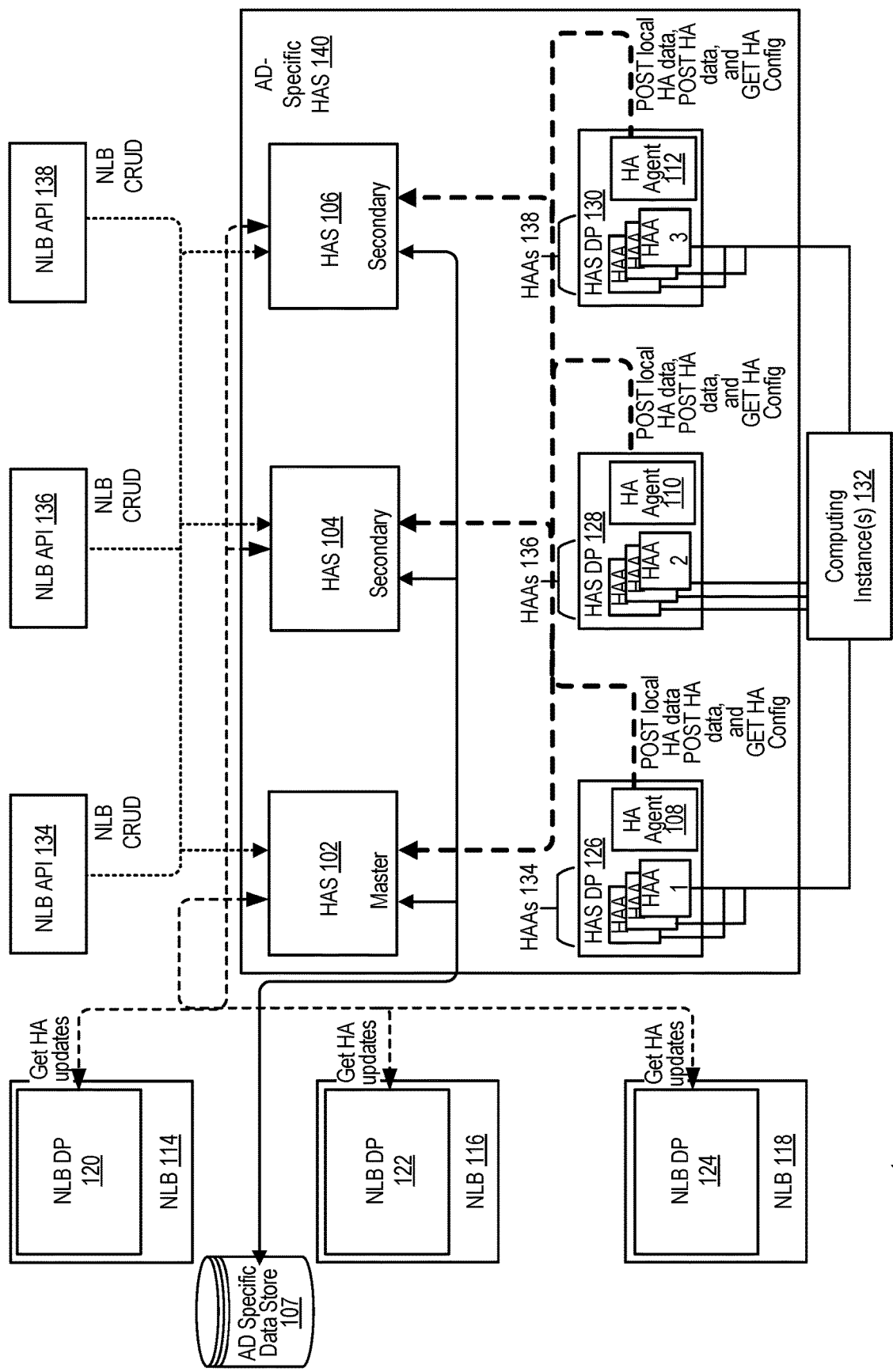
FIG. 1 illustrates example computing components of a health assessment service corresponding to an availability-domain, in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to a system and method for managing a distributed computing system and health assessment data that indicates information regarding the health of a computing instance of a distributed computing system (e.g., in a cloud-computing system). A distributed computing system (e.g., a computing cluster) may include any suitable number of computing instances (e.g., computing nodes, virtual machines, virtualized containers, etc.) that perform operations in a coordinated manner. In some embodiments, a computing cluster may be provided in a cloud-computing environment. A "cloud-computing environment" may refer to a distributed system in which data storage and computing resources are provided over the Internet. As used herein, a "computing instance" (also referred to as "node" and/or "a worker node") may include a server, a computing device, a virtual machine, a virtualized container, or any suitable physical or virtual computing resource configured to perform operations as part of a computing cluster. By way of example, a computing cluster may include one or more master nodes and one or more worker nodes, both being examples of a computing node of a computing cluster. In some embodiments, a master node performs any suitable operations related to task assignment corresponding to one or more worker nodes, load balancing, node provisioning, node removal, or any suitable operations corresponding to managing the computing cluster. A worker node is configured to perform operations corresponding to tasks assigned to it by one or more master nodes. As a non-limiting example, a worker node can perform data storage and/or data retrieval tasks associated with a database at the behest of a master node that assigns the worker node a particular storage/retrieval task.

In some embodiments, a distributed Health Assessment (HA) service (referred to as an "HA service" for brevity) may configure any suitable number of computing devices with HA data planes (DPs). Each data plane (DP) may include an HA Agent. The HA service or the HA agent may be configured to instantiate any suitable number of HA applications. Each HA application may be configured to monitor (e.g., probe for) the health of a corresponding node/instance of a computing cluster. In some embodiments, the computing device(s) on which the HA service data planes are configured are separate and distinct computing device(s) than those that operate the computing cluster being monitored. The heath assessment (HA) data received by the HA applications and compiled/processed by the HA service may be transmitted to a set of load balancers configured to manage a workflow of the computing cluster. Load balancers may then utilize the health assessment data in order to distribute workload tasks to healthy backend nodes while avoiding distributing workload tasks to unhealthy nodes.

Similar techniques may be used by a distributed HA service (e.g., the same HA service discussed above or a different HA service) to monitor the health of a set of network load balancers. Each network load balancer may execute an HA agent and one or more HA applications configured to probe one or more network load balancers for HA data. The health of each network load balancer can be identified and used to determine which network load balancers to use for workload distribution. Either, or both, of the HA services (e.g., the one used to monitor the computing cluster and the one used to monitor the network load balancers) may store the collected HA data in a distributed cache which can be access upon request. The system may maintain the last data seen and sent to a client in response to request such that only data that is changed (e.g., changed from the last transmission to the client) will be transmitted.

Conventional systems may utilize relational databases that may be susceptible to data collisions (e.g., an event that occurs when simultaneous changes to data associated with identical keys). In order to avoid collisions, such systems may employ locking mechanisms such that changes may only be made by one component at a time. This can cause increased latency as changes to the same records would need to be performed in sequence rather than in parallel. Additionally, such systems may utilize disk memory.

The techniques discussed herein provide a number of technical improvements over conventional systems. The distributed caches described herein utilize in-memory caches that result in faster data access than that of disk memory. Additionally, the distributed nature of the caches enable parallel queries to be performed on different portions of the distributed data. Still further, in some embodiments, the data of the distributed cache may be stored with in a concurrent thread-safe lock-free data structure (e.g., a hash array mapped tree structure, a Ctrie data structure, etc.). The use of this data structure may support O(1) algorithmic complexity for atomic, lock-free snapshots. Thus, the risk of data collisions is greatly reduced, or substantially eliminated, when compared to the data collision risk of conventional systems. As described in detail in connection with FIG. 3, the disclosed techniques enable HA data to be transmitted in response to request by sending only data that has changed from the data that has been previously sent to the client. Still further, conventional systems may require a client to request health data for each and every monitored node. However, the techniques described herein maintain a mapping between a client ID and one or more monitored nodes. This mapping can be utilized such that a client need only provide its client ID and the HA data (or the changes in HA data) may be gathered and transmitted in a single request, greatly reducing the number of messages within the network. With these advancements, computing operations may be reduced at both the sender (e.g., a client device) and the receiver (e.g., a remote procedure call thread of the system) of the request. Still further, the size of the caches discussed herein may be dynamically allocated to increase or reduce the storage space as needed at run-time. This enables the system to dynamically scale the cache(s) to fit the needs of the system by adding more computing instances to those implementing the distributed cache. This can be advantageous over systems that have a static amount of memory where increasing storage would require replacing previous computing components with replacements having bigger local memory components.

Moving on to FIG. 1, which illustrates example computing components of a health assessment service corresponding to an availability-domain (e.g., one or more data centers located within a region) of a cloud-computing environment 100, in accordance with at least one embodiment. A number of instances of the health assessment (HA) service (e.g., HAS 102, a primary/master, and HAS 104 and HAS 106 that act as one or more secondary services as depicted in FIG. 1) may be executed to provide data redundancy. Each HA service may expose an API with which the functionality of the HA service may be invoked. Each HA service may operate a separate service (e.g., a distribution service) that is configured to manage a distributed health assessment service over many data planes that are configured to monitor a computing cluster (e.g., the computing instance(s) 132). At startup, or another suitable time, multiple instances of the HA service (HAS 102, HAS 104, and HAS 106) may be started. In some embodiments, HAS 102 is previously designated as a master, while in other embodiments, the HAS 102-106 may perform any suitable leader election algorithm to identify a master from among the HA service instances. It should be appreciated that HAS 104 and 106, as secondary services, may be configured to receive any suitable data transmitted by the HAS 102 and/or HA agents (HA agents 108, 110, and 112), any HA service, or any suitable component of the computing components of FIG. 1 in order to distribute load and provide redundancy should HAS 102 be incapable of executing as master (e.g., the computing device on which HAS 102 crashes).

HAS 102 may periodically read from a database (e.g., availability domain (AD) specific data store 107) to identify a set of computing instances (e.g., nodes of the computing instance(s) 132) for which future workflows are to be managed with one or more network load balancers (NLBs) (e.g., NLBs 114, 116, and 118). The set of instances may be dynamically configured by tenants by means of interaction with a regional control plane (e.g., the regional control plane 203 of FIG. 2), and persisted to the database (e.g., the AD specific data store 107) by the control plane. Each NLB may include a NLB data plane (DP) (e.g., NLB DP 120, NLB DP 122, NLB DP 124, as depicted in FIG. 1) that is configured to store health assessment data received from an HA service (e.g., a distributed service including HASs 102-106). Each NLB may be configured to make decisions regarding load balancing of the set of instances (e.g., virtual machines, computing devices, virtualized containers, etc.) to which they are assigned load balancing responsibilities, based at least in part on the health assessment data received from the HA service (e.g., HASs 102-106). It should be appreciated that while a certain number of HA service instances and NLB DPs are shown in FIG. 1, any suitable number of instances may be utilized. Each NLB (e.g., NLB 114, 116, and 118) may expose a corresponding API (e.g., NLB API 134, 136, and 138, respectively) that may be utilized to invoke the functionality of each NLB (e.g., to distribute a Create, Read, Update, Delete (CRUD) request to a node of the computing instance(s) 132 for processing). In some embodiments, a CRUD request may cause data to be transmitted via an API of an HA service (e.g., HASs 102-106) to invoke the functionality of the HA Service (e.g., the distributed service operating at HASs 102-106).

A number of HA service data plane instances (e.g., HAS DP 126, HAS DP 128, and HAS DP 130) may operate on a corresponding computing device (e.g., server computers that are separate/distinct from the computing devices on which the instances that correspond to the load balancers execute). In some embodiments, the HA service data plane instances may operate on the same computing devices as the network load balancers of FIG. 1. In some embodiments, the devices that operate HA service data planes are different from the computing instances of the computing instance(s) 132.

The health assessment service operating as master (e.g., HAS 102) is configured to read monitoring data from the database (e.g., AD specific data store 107) to identify the computing instances of the HA service data plane (e.g., HAS DP 126-130). The monitoring data may also store the identities of the computing instances (e.g., nodes of the computing instance(s) 132) to be monitored, the type of probe (e.g., TCP, HTTP, HTTPS, UDP, etc.) to be utilized for a health status assessment of each node. Each instance may be associated with a NLB identifier, an instance identifier, and a pod identifier. A pod identifier may identify a group of instances to which the particular instance belongs. By way of example, a pod may include all of the instances associated with a given client entity (e.g., a tenant of the cloud-computing/distributed computing system) and an identifier corresponding to the client entity may be associated with each instance corresponding to the client entity to identify which instances belong to that client entity.

Each computing device to be utilized for health assessments may be configured with an agent (Health Assessment (HA) agent such as HA agents 108-112) that is configured to communicate with the master HA service (e.g., HASs 102-106) to provide health assessment data for the computing device on which the HA agent executes. The HA agent may transmit a GET HC configuration (config) message to the master HA service (e.g., HAS 102) to request configuration instructions (e.g., which instances (e.g., computing nodes, virtualized containers, back ends, etc.) of the computing instance(s) 132 are assigned to the HA service DP corresponding to the HA agent, what probes are to be utilized for obtaining health assessment data for each assigned instance (node), etc.). In some embodiments, the HA agent (e.g., HA agent 108) may transmit within the GET HC config message any suitable health assessment data for the computing device on which it executes. By way of example, the HA agent 108 may transmit metrics indicating processing and/or storage resources (e.g., CPU, memory utilization, etc.) of the computing device on which HAS DP 126 is configured.

The master HA service (e.g., HAS 102) may be configured to execute an algorithm that identifies a set of instances of the computing instance(s) 132 to assign to each HA service data plane (HAS DP). The algorithm may be configured to take into account the available resources of the computing device(s) on which each HAS DP is configured, the available resources of other computing devices that are also configured to probe instances of the computing cluster, and the type of probe to be utilized for obtaining a given instance's health assessment data. In some embodiments, each type of probe may be preassigned a value indicating an amount of processing needed for executing the probe (e.g., sending a message via a suitable protocol such as TCP, HTTP, HTTPS, UDP, or the like in order to obtain health assessment data from the instance). The master HA service (e.g., HAS 102) may assign a set of instances to each HAS DP for which the HAS DP is to perform health assessments/probes. In some embodiments, the set of instances assigned to the HAS DPs may not be mutually exclusive. That is, some instances may be assigned to more than one HAS DP.

In response to the GET HC config message, the master (e.g., HAS 102) may be configured to transmit configuration data (e.g., including instance assignments, what probe to use for each instance, a schedule or other timing data corresponding to the probes, etc.) to the various HAS DPs (e.g., to the HA agents 108-112 operating in HAS DPs 126-130). Upon receipt of the configuration data by the HA agent, a number of Health Assessment Applications (HAAs) (e.g., HAAs 134, 136, and 138, respectively) may be instantiated in accordance with the configuration data. Initially, the computing device may not have include any HA applications. In some embodiments, each HA application may be a virtual machine configured to execute code to implement the functionality of an HA application. Thus, each HA application may be configured by the HA agent of the same data plane to probe a particular instance of the computing cluster. Each HA application may be configured to transmit a probe (e.g., of the type indicated by the HA Agent and obtained from the HAS 1) to its corresponding instance in accordance with the configuration data received and stored by the HA agent of the data plane. Alternatively, the HAS 102 itself may be configured to instantiate the various number of HA applications on each HAS DP and configure each one to probe a particular instance of the computing cluster in accordance with the configuration data.

Receiving a probe by a computing instance of the computing instance(s) 132 may cause the instance to respond with health assessment (HA) data. The particular data fields included in the response may differ depending on the probe used. The HA application may then be configured to transmit to the master HA service (e.g., HAS 102) directly, or via its corresponding HA agent, the health assessment data via a POST HC Status message. In some embodiments, "health assessment data" may include any suitable combination of an identifier for the probed instance (e.g., a node of the computing instance(s) 132), an identifier for the HAS DP (e.g., an identifier for the HAS DP 126), an indicator indicating the health of the instance (e.g., healthy/unhealthy), performance metrics, available processing/storage resources of the probed instance, or the like. In some embodiments, any suitable data received from the instance by the HAS DP may be transmitted via the POST HC Status message to the master HA service (e.g., HAS 102).

In some embodiments, the HA applications of each data plane are configured to monitor/probe a particular set of nodes of the computing cluster. Since these sets may not be mutually exclusive (e.g., one or more nodes monitored/probed by the HA applications of HAS DP 126 may also be monitored/probed by the HA applications of HAS DP 128 and/or HAS DP 130), the master HAS (e.g., HAS 102) may be configured to identify an overall health status of a given node using the health assessment data received (e.g., from each HA agent of the HAS DPs 126-130). By way of example, HAS DP 126 and 128 may be configured to monitor/probe a common node of the computing instance(s) 132. A corresponding HA application of the HAS DPs 126 and 128 may probe the node and provide health assessment data to the HA service (e.g., HAS 102) through their corresponding HA agents (HA agent 108 and HA agent 110, respectively). The HA service (e.g., HAS 102) may determine the node's status according to a predetermined rule set. The rule set may specify that a node is healthy when the health assessment (HA) data from each probing HA application indicates the node is healthy or when at least one probe indicates the node is health and all other probes indicate HA data is absent. The rule set may further specify that if any HA data indicates an unhealthy node, than the node may be considered unhealthy. The rule set may further specify that if no HA data has been obtained for the node, then the health state for the node is unknown. The following table depicts an example rule set and overall health state determined for a given node (N1).

TABLE 1

| Node | HAA 1 | HAA 2 | Overall Health State for Node N1 |
| --- | --- | --- | --- |
| N1 | Healthy | Healthy | Healthy |
| | Healthy | Unhealthy | Unhealthy |
| | Healthy | HAD absent | Healthy |
| | Unhealthy | HAD absent | Unhealthy |
| | HAD absent | HAD absent | Unknown |

In some embodiments, the master HA service (e.g., HAS 102) is configured to store the HA data in an availability domain (AD) specific data store (e.g., the AD specific data store 107, referred to for brevity as "data store 107"). In some embodiments, the data store 107 may be a distributed data store that is accessible to other computing components of the cloud-computing environment 100 (e.g., the NLBs 114-118, other Health Assessment Services, other services, applications, or devices, etc.). In some embodiments, each computing device in the cloud-computing environment 100 may be preconfigured with a communication protocol for accessing the distributed data store (also referred to as a "distributed cache"). In some embodiments, the distributed data store may be an in-memory (e.g., in local memory such as RAM) distributed cache (e.g., a cache that is distributed over a number of computing devices of a cloud-computing environment 100 such as a computing cluster different from the computing instance(s) 132).

In some embodiments, in response to determining a node is unhealthy and/or the health of a node is unknown a predefined protocol may be executed to identify one or more remedial actions. By way of example, when a node is deemed unhealthy, the node may be removed from the computing instance(s) 132 from which NLBs 114-118 select for processing tasks. In some embodiments, the HA service (e.g., HA 102) is configured to transmit a notification via any suitable electronic medium (e.g., email, SMS text, push notification, and the like) to notify a user (e.g., a network administrator) of the state of the unhealthy node. In some embodiments, the HA service may be configured to perform any suitable operations for shutting down the unhealthy node and/or for removing the unhealthy node from the cluster. In some embodiments, when the unhealthy node has been shut down and/or removed, the HA service may update the data store 107 either to remove the status of the node entirely or to update the status to indicate the node has been removed and/or shut down. In some embodiments, the HA service may deem the node unhealthy if the status of the node remains unknown for a predefined threshold period of time (e.g., 5 minutes, 1 hour, etc.). If the threshold period of time has elapsed since the HA service first determined the status was unknown (or potentially from receipt of the last status update indicating the node health was unknown), the HA service may automatically remove the node and/or transmit a notification that indicates the period of time for which health status of the node has been unknown has breached the predefined threshold.

Figure 2:
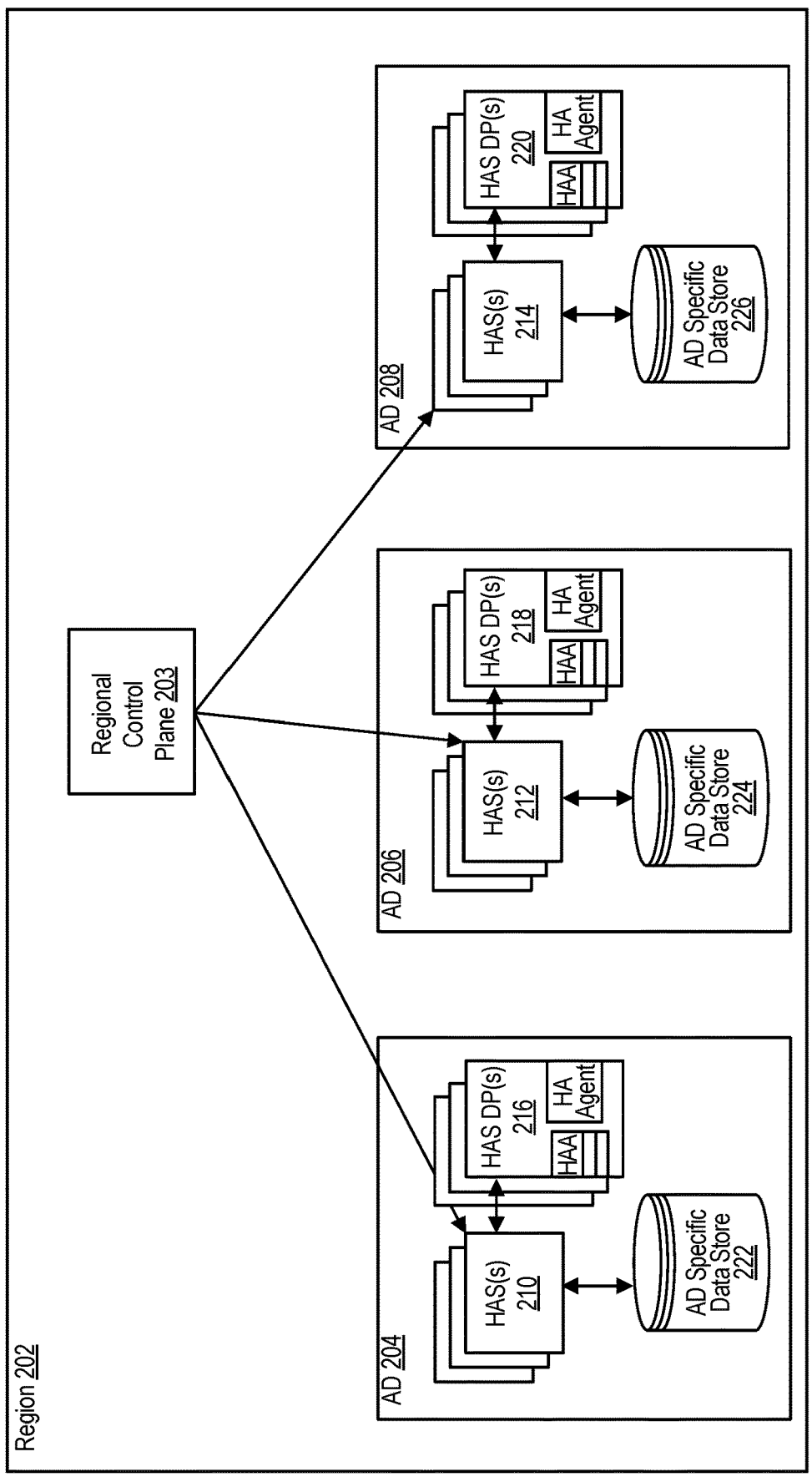
FIG. 2 illustrates example health assessment service components from a regional view, in accordance with at least one embodiment.

It should be appreciated that a separate Health Assessment Service (e.g., including every instance of HAS and every HA Agent) may run in each availability domain to ascertain the health of the instances of the computing cluster within that availability domain (AD). By way of example, AD Specific HAS 140 may be specific to a particular availability domain (e.g., "AD1") while another AD Specific HAS (not depicted) may be specific to a different availability domain. However, both of the AD Specific HASs may be utilized to monitor the same set of computing nodes (e.g., computing nodes 132) for redundancy purposes. FIG. 2 describes this feature in more detail.

By way of example, FIG. 2 illustrates example health assessment service components from a regional view, in accordance with at least one embodiment. As depicted in FIG. 2, a single region (geographical region such as region 202) may include any suitable number of Availability Domains (ADs) (e.g., ADs 204-208, as depicted) which are managed by a regional control plane (e.g., Regional Control Plane 203). As depicted in FIG. 2, each AD may execute its own HA service (e.g., including HA service instances such as HAS(s) 210, HAS(s) 212, and HAS(s) 214). Each of the HAS(s) 210-214 may be an example of the HAS 102, HAS 104, and/or HAS 106 of FIG. 1.

In some embodiments, at least one HA service of each AD may configure one or more corresponding data planes (e.g., HAS DP(s) 216, 218, and 220, each an example of any of the HAS DPs 126-130 of FIG. 1). Each HAS DP can include a corresponding Health Assessment agent (e.g., an HA agent that is an example of the HA agents 108-112 of FIG. 1). Each HAS DP can further include any suitable number of Health Assessment Applications. Each HA application can be configured to monitor/probe for the health of a corresponding computing instance (e.g., a node) of a computing cluster (e.g., the computing component(s) 132 of FIG. 1).

The components of each of ADs 204-208 may operate together in a similar manner as described above in FIG. 1 with respect to a single AD. Although a certain number of ADs, HASs, HAS DP(s), HAAs, HA agents, and AD specific data stores are shown in FIG. 2, any suitable number of these components can be utilized.

Figure 3:
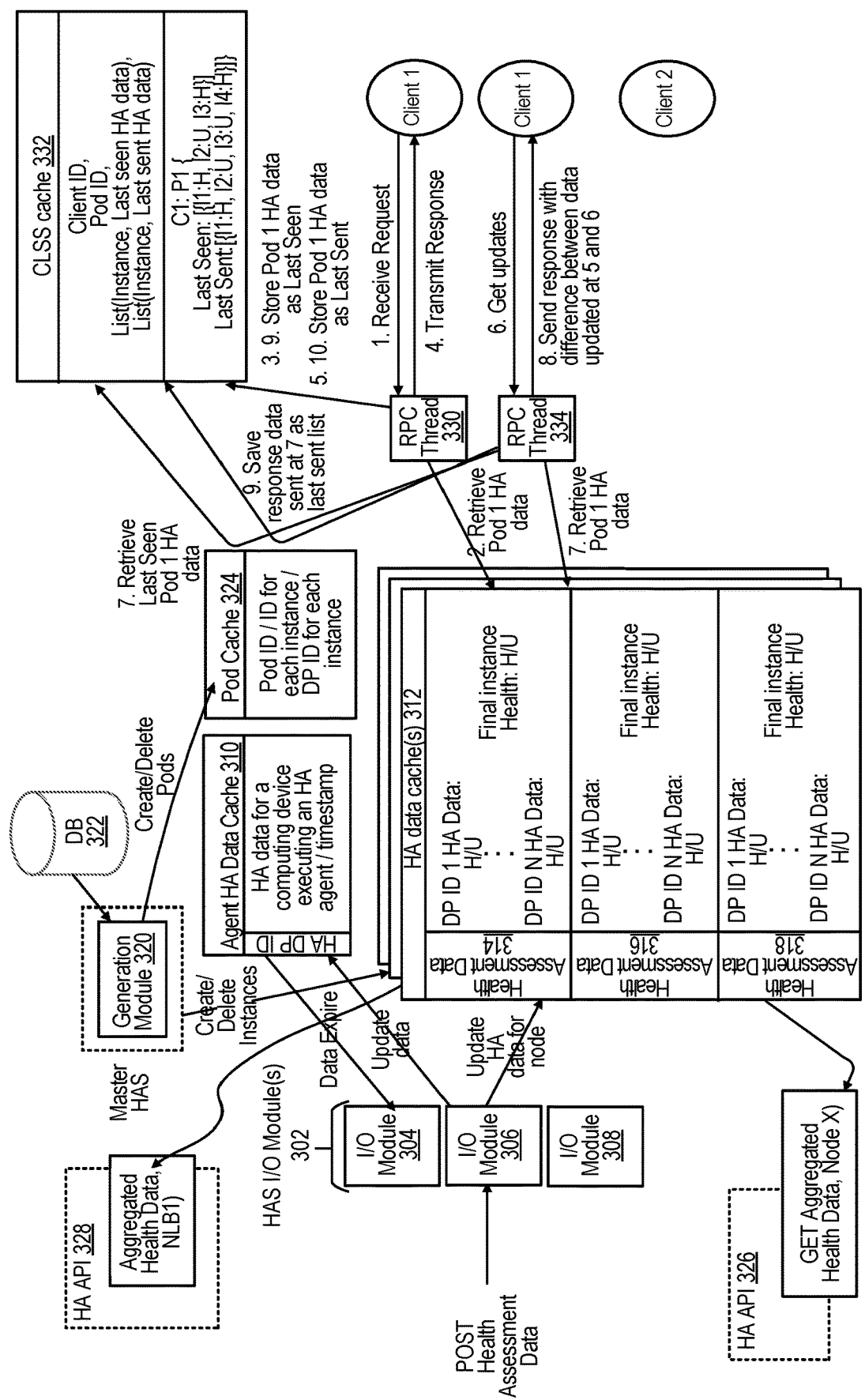
FIG. 3 illustrates a number of distributed caches utilized by a distributed health assessment service, in accordance with at least one embodiment.

FIG. 3 illustrates a number of distributed caches utilized by a distributed health assessment service (e.g., the HA service discussed above in connection with FIGS. 1 and 2), in accordance with at least one embodiment. The health assessment (HA) data may be received, for example, by a module of a distributed health assessment service (e.g., HAS Input/Output (I/O) Modules 302). Each of the I/O modules 302 may operate as part of any of the HASs 102-106 of FIG. 1). Each HA service instance of FIG. 1 (e.g., HAS 102, 104, and/or 106) may include a corresponding I/O module that is configured to store the health assessment (HA) data it received (e.g., from the HA agent(s) and/or HA applications of FIG. 1). By way of example, I/O module 304 may operate as part of HAS 102, I/O module 306 may operate as part of HAS 104, and I/O module 308 may operate as part of HAS 106 of FIG. 1.

In some embodiments, if the HA data received corresponds to a computing device on which an HA agent (e.g., the HA agent 108 of FIG. 1) executes, then the receiving I/O module (e.g., I/O module 306) may be configured to store the health assessment data in a distributed data store such as the Agent Health Assessment (HA) Data Cache 310. In some embodiments, the agent HA data cache 310 may be an in-memory distributed data store. The HA data for a given computing device on which an HA agent executes, may be associated with an identifier for the corresponding health assessment service (HAS) data plane (DP) (e.g., an identifier corresponding to the HAS DP 126 of FIG. 1) and may include a timestamp or the HA data may be timestamped on receipt before the data is stored. In some embodiments, the HAS 102 of FIG. 1 (or any of the instances of the HAS (e.g., HASs 104 and/or 106) of FIG. 1) may be configured to utilize the agent HA data cache 310 to identify healthy computing devices with which health assessments (e.g., transmission of probes, reception of corresponding HA data, etc.) may be performed. Thus, when determining what computing devices to assign probing responsibility may depend, at least in part, on the HA data of the computing devices as indicated in the agent HA data cache 310. The HA service may be configured to utilize only computing devices providing a portion of the health assessment service data plane (e.g., HAS DPs 126-130 of FIG. 1) that are considered healthy according to predefined rule set (e.g., ones that have provided a status such as "healthy", ones that have over a threshold amount of available processing/storage resources, etc.). Additionally, the HA service may balance the load on the HAS DP by distributing the responsibility for different health assessments based on the estimated consumption of compute resources (CPU cycles, network bandwidth, RAM, etc.) and the availability of these resources corresponding to each computing device on which each HAS DP is configured.

If the HA data received by the I/O module (e.g., I/O module 306) is HA data for an instance of the computing cluster (e.g., the computing instance(s) 132 of FIG. 1), then that data may be stored in an in-memory distributed data store (e.g., HA data cache(s) 312). In some embodiments all HA data for the computing cluster may be stored in a single HA data cache (e.g., the HA data cache(s) 312 may be a single cache), or each instance of the HA data cache(s) 312 may correspond to a particular pod/group of computing nodes of the computing cluster. In some embodiments, the HA data of an instance may be maintained as an entry of the HA state cache(s) 312 and/or the health assessment data of an instance (e.g., a computing node of the computing instance(s) 132) may be stored with HA data corresponding to other instances in the same pod (e.g., group of associated instances). If stored separately, as depicted in FIG. 3, the HA data may include an identifier of the pod to which the instance relates. In some embodiments, an entry of the HA data cache may include multiple instances of HA data corresponding a particular computing instance of the computing cluster. That is, when multiple HAS DPs are configured to obtain HA data for a given instance, each instance of HA data may be stored in a common entry (e.g., HA data 314 may correspond to multiple instances of health data obtained by different DPs of the same computing instance). In some embodiments, the I/O module (e.g., the I/O module 306) may be configured to identify an overall health state for the instance. By way of example, the I/O module may be configured to obtain a health state corresponding to each instance of HA data received for the computing instance. In some embodiments, if any of the instances of health assessment data indicates the computing instance is unhealthy, the I/O module may be configured to set an indicator (e.g., the final instance health) in the entry to indicate the computing instance is unhealthy. Conversely, if every instance of health assessment data received indicates that the computing instance is healthy, the I/O module may be configured to set an indicator (e.g., final instance health) in the entry of the HA data cache 312 to indicate the computing instance is healthy. In some embodiments, the final instance health may be identified based at least in part on the rules described above in connection with FIG. 1.

As a non-limiting example, one instance of the HA data cache(s) 312 may be maintained for a given pod (e.g., a pod corresponding to the nodes associated with client 1. As depicted in FIG. 3, the pod corresponding to client 1 may include three nodes of the computing instance(s) 132 of FIG. 1. Each of these computing nodes of the computing cluster can be probed by any suitable number of the HA applications of FIG. 1 (e.g., an HA application of each HA data plane of FIG. 1). For example, health assessment data 314 may correspond to a particular computing component, while health assessment data 316 and 318 correspond to different computing components of the computing cluster. The I/O module receiving an instance of the HA data 314 (e.g., I/O module 306) may calculate the final instance health for the computing component of the computing component(s) (e.g., when it identifies that all HA agents assigned to the node have responded with HA data, or at any suitable time).

In some embodiments, the HA data cache(s) 312 may store data in a concurrent thread-safe, lock-free data structure. By way of example, the HA data cache(s) 312 may utilize a concurrent hash-trie (e.g., a Ctrie) that is configured to support O(1), atomic, lock-free snapshots. The data structure utilized for HA data cache(s) 312 may be a non-blocking concurrent hash array mapped tree structure that is based on single-word compare and swap instructions. The data structure may be configured to support concurrent lookup, insert and remove operations. In some embodiments, the data structure may utilize an n-bit (e.g., 32 bit, etc.) space for hash values that has low risk of data collisions in relation to other data structures utilized for storage.

Each instance of the HA service may execute a generation module. By way of example, the master HA service (e.g., HAS 102 of FIG. 1) may execute generation module 320. Each generation module may be configured to read from a database (e.g., DB 322, an example of the AD specific data store 107 of FIG. 1). To identify configuration data indicating one or more pods that individually include one or more computing nodes/instances within a computing cluster such as the computing instance(s) 132 of FIG. 1. The generation module 320 may utilize the configuration data to create pod cache 324. Pod cache 324 may be a distributed or local cache (e.g., local to the master HAS) that maintains a mapping of an identifier for each instance, the pod ID corresponding to each instance, and the DP identifier corresponding to the HA DP that executes the HA agent (and HA application) assigned to obtain HA data from each instance. As discussed above, conventional systems may lack this mapping between pod ID, instance, and DP identifier. In those systems, clients may be required to transmit a request for each instance. By utilizing the pod cache 324 as described herein, a single request may be provided with the client ID. This single request can be utilized to gather all of the HA data corresponding to each instances associated with the client ID (as determined from the pod cache 324). In some embodiments, the data may be aggregated prior to responding to the client to enable the use of a single response message. Enabling the use of a single request and/or a single response message greatly reduces the number of messages of the system/network which reduces the overall processing burden of the system as a whole.

The generation module 320 may be configured to create an instance of an HA data cache for each pod (e.g., the HA data cache(s) 312). The generation module 320 may generate the Agent HA data cache 310 that maintains HA data for each computing device executing an HA agent. Each instance of HA data corresponding to a given HA agent can be associated with an HA DP identifier corresponding to the HA DP on which the HA agent executes and a timestamp corresponding to the last HA data update for each HA agent.

In some embodiments, an application programming interface (e.g., HA API 326) may be provided that enables other services to directly query the HA data cache(s) 312 for health status of an instance and/or a pod. Upon receiving a request via the HP API 326, an HAS (e.g., HAS 106 of FIG. 1) may obtain aggregated HA data (e.g., HA data 314) for a given node. In some embodiments, the same API or a different API may be utilized in a similar manner to obtain HA data (e.g., HA data 314-318) for a given pod. In some embodiments, the HA data cache(s) 312 may further be configured to store HA data corresponding to a particular network load balancer (e.g., the NLBs 114-118 of FIG. 1). HA API 328, a same or different API as the HA API 326, may be utilized to retrieve the HA data for a particular NLB.

In some embodiments, the HAS (e.g., the HASs 102-106 of FIG. 1) may utilize any suitable number of Remote Procedure Call (RPC) threads (e.g., Google Remote Procedure Call®, etc.) for receiving and processing requests for health status from a corresponding number of client devices (e.g., user devices operated by or on behalf of a tenant associated with an instance or pod such as clients 1, 2, and 3). As used herein, a Remote Procedure Call may also be referred to as a "consumer thread." In at least one example, the client 1 may be associated with pod 1 and client 2 with pod 2. Each pod may be associated with a predetermined set of one or more instances of the computing cluster). These predetermined associations may be stored in a configuration file that is stored in a database (e.g., DB 322) that is read periodically by the HAS (e.g., by the generation module 320). The HAS may read that configuration file and instantiate and initialize the pod cache 324, an in-memory distributed cache for storing the associations between a pod and its corresponding set of instances and the corresponding data planes assigned to monitor each instance.

At step 1, an RPC thread (e.g., RPC 330) may receive and process a request from a client device (e.g., a client device associated with client 1). If the request corresponds to a single instance, the RPC thread 330 may query the HA data cache(s) 312 for the HA data (including the final instance health) of the given instance. If the request corresponds to a pod, the RPC may first identify the instances corresponding to the pod by utilizing the pod identifier from the request as a lookup with pod cache 324. In some embodiments, an RPC thread may obtain the identifiers associated with the instances corresponding to the pod.

At step 2, once the instance identifiers are known (either from the request itself, or from retrieval from the pod cache 324), the RPC thread 330 may execute a scatter/gather query to retrieve the HA data for each instance associated with the pod. The RPC thread 330 may be configured to check another in-memory distributed cache (e.g., Client Last Seen/Sent (CLSS) cache 332) to determine whether the client has been previously sent data for the pod/instance.

Since no health assessment data has been previously been sent to the client, the RPC thread 330 may store the HA data for each instance of the pod in the CLSS cache 332 at step 3. The HA data for each instance may be stored as a list of last seen data. By storing this data, the system may track the last health assessment data for each instance as sent to the client.

At step 4, the RPC thread 330 may then transmit to client 1 the HA data for each instance in pod 1. In some embodiments, the transmission at step 4 may include separate messages (e.g., one for each instance) or a single message (e.g., one for the pod). In some embodiments, the client may provide an acknowledgement that the data was received (e.g., an acknowledgement for each instance message, an acknowledgement for the pod message).

In some cases, at step 5, the RPC thread 330 may store the data sent to the client in CLSS cache 332 to maintain an ongoing record of the last data sent by the client. Should the client later request the data again (e.g., for the pod or a particular instance), a RPC thread (a new thread) may be configured to retrieve the data last sent to the client from the CLSS cache 332 and retransmit that HA data to the client device. Thus, the CLSS cache 332 may store an entry for every unique client ID/pod ID pair.

At step 6, the client 1 may request updated health assessment data (e.g., for the instances in pod 1, for one or more instances of one or more pods, etc.). The receiving RPC thread 334 may retrieve new health assessment data for each instance requested (e.g., each instance in pod 1) from the HA data cache(s) 312 at step 7. The RPC thread 334 may then be configured to calculate the changes to the HA data by determining differences between the stored health assessment data (e.g., the HA data last seen for each instance).

At step 8, the RPC thread 334 may be configured to send only the changes (referred to as "change data" indicating the data retrieved from the HA data cache(s) 312 at step 7 that is different than the last seen data for that client ID/pod ID pair) to the client device which provides an efficiency benefit over sending the full set of HA data each time. A list including the data retrieved at step 7 for each instance may be stored in the CLSS cache 332 at step 9. If the client device acknowledges receipt, the RPC thread 334 may use the change data to update the last sent data in the CLSS cache at step 10. Thus, the last seen data may include the originally transmitted values (e.g., values not corresponding to the change data that were transmitted at step 4) and data values corresponding to the change data that was transmitted at step 8, where the change data values overwrite the corresponding values of the originally transmitted values thereby maintaining a record of the last value sent for every data field of the HA data regardless of when the value was transmitted (e.g., in the first transmission at step 4 or the second transmission at step 8).

Although not depicted, in some embodiments, the RPC thread 330 and 334 may each correspond to a computing device (e.g., one of one or more servers, etc.) on which a local instance of the HA data cache(s) 312 may be maintained. In some embodiments, the corresponding server devices may subscribe to an event publishing service to be notified on change to the HA data cache(s) 312. Thus, in some embodiments, requests may be processed by these server devices without querying the HA data cache(s) 312.

In some embodiments, the HA data may be maintained with a version number corresponding to a set of changes to the HA data. For example, a first set of HA data for a given computing component (e.g., one of the computing component(s) 132 of FIG. 1) may be labeled and/or associated with version 1. Upon obtaining subsequent HA data for the same computing component, the HA data, including any changed data fields may be stored with a label and/or association to version 2. Each change may correspond to a new version. Thus, when a customer request is received, a snapshot of the HA data at the given time may be maintained in the CLSS cache 332 with an association to the version to which that instance of the data corresponds. When a subsequent request is received from the same client, the RPC thread (e.g., RPC thread 330) may determine whether the version last sent to the client corresponds to a different version than the version currently stored in the HA data cache(s) 312. If so, the data in the CLSS cache 332 may be updated as described above. However, if the version that was last seen by the client matches the version stored in the CLSS cache 332 no data (or an indication that no changes have been made) can be transmitted in response to the client's request.

Figure 4:
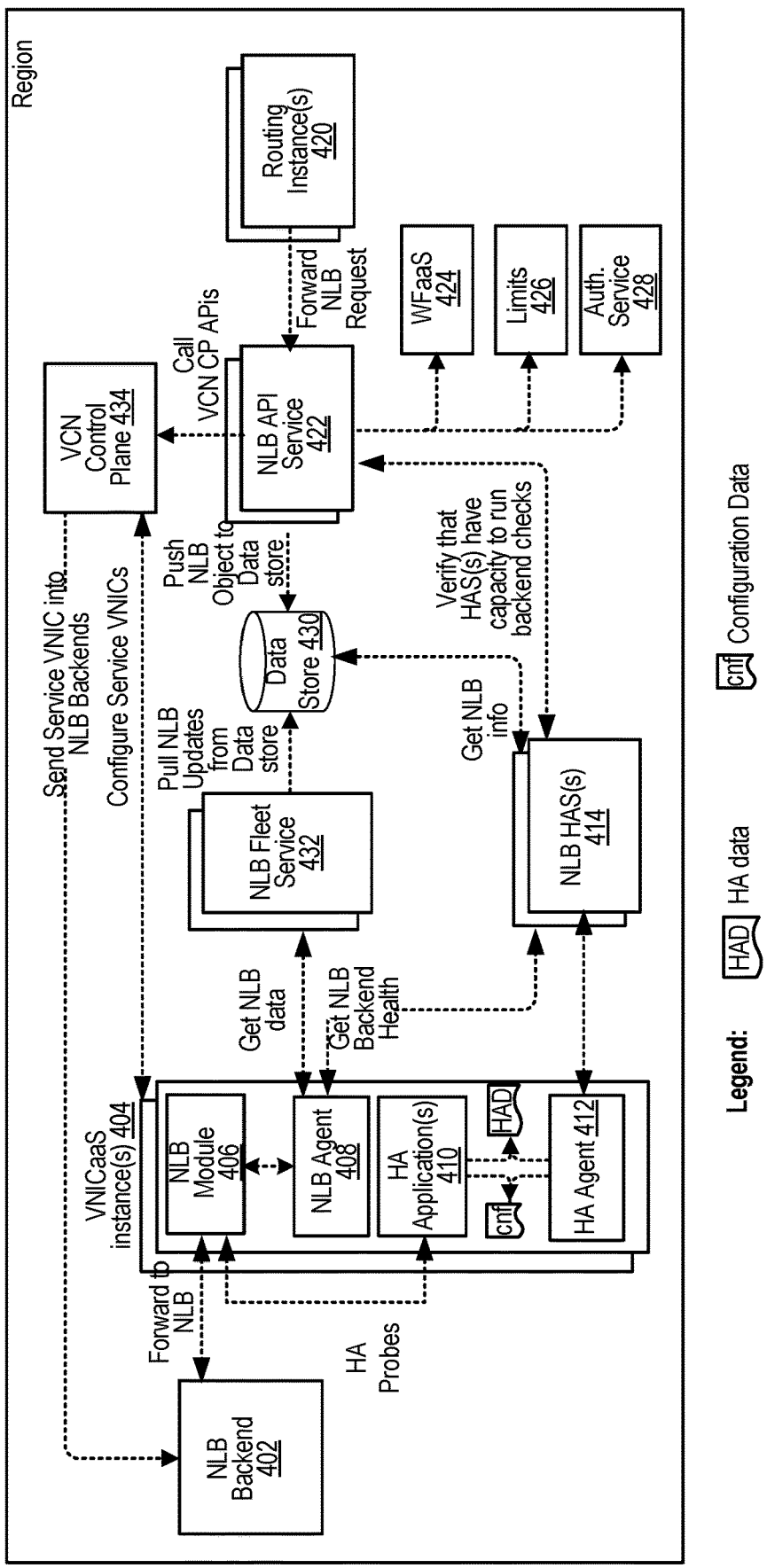
FIG. 4 illustrates an environment for implementing an enhanced load balancer, the enhanced load balancer being configured to execute a health assessment agent configured to communicate with the health assessment service, in accordance with at least one embodiment.

FIG. 4 illustrates an environment for implementing an enhanced load balancer (e.g., NLB backend 402), in accordance with at least one embodiment. Each enhanced load balancer (e.g., the NLB backend 402) may be associated with a corresponding service VNIC (e.g., an instance of VNICaaS instance(s) 404). Each VNIC service (e.g., an instance of the VNICaaS instance(s) 404) may be configured to execute NLB module 406, NLB agent 408, one or more health assessment applications (e.g., HA application(s) 410), and HA agent 412. NLB Module 406 may be configured to transmit and receive data from NLB backend 402. In some embodiments, NLB module 406 may transmit HA probes received from HA application(s) 410 to NLB backend 402 and receive response data (e.g., health assessment (HA) data) from the NLB backend 402 which it can then forward to the HA application that initiated the probe. HA application(s) 410 may include one HA application per NLB for each availability domain (AD) in which the NLB operates.

The HA agent 412 may be configured to get HA configuration data (referred to in FIG. 4 as "configuration data") from the HAS(s) 414 (e.g., one or more computing nodes configured to execute an instance of the HA service). HA agent 412 may be configured to communicate with any suitable number of the HA application(s) 410 to obtain HA data corresponding to any suitable number of network load balancers. In some embodiments, the HA agent 412 may transmit the HA data to the NLB HAS(s) 414 which may then store the HA data for each NLB backend in the system (e.g., including NLB backend 402) in a distributed cache (e.g., a distributed cache similar to the HA data cache 312 of FIG. 3). In some embodiments, the HA data for each backend NLB may be stored in the HA data cache 312 or a separate distributed cache configured to store only HA data related to NLBs. The HA Agent 412 may transmit HA data related to the VNICaaS instance on which HA agent 412 executes and/or HA data corresponding to any suitable number of NLBs. Thus, HA application(s) 410 and HA agent 412 may be considered similar to the HA applications and HA agent of an HA data plane of FIG. 1, but in the context of monitoring the health of load balancers that manage workloads of a computing cluster instead of monitoring the health of the nodes of the computing cluster.

NLB Agent 408 may be configured to request/receive NLB backend HA data from the NLB HAS(s) 414 (e.g., from a particular NLB HAS operating as a master). The NLB agent 408 may communicate the HA data to the NLB module 406 that may forward the HA data to the NLB backend 402 such that the NLB backend 402 may utilize the HA data to make load balancing decisions. Although not depicted in FIG. 4, the VNICaaS instance(s) 404 could operate as HA DPs like those discussed with respect to FIG. 1. Thus, in some embodiments, the VNICaaS instance(s) 404 could be configured to monitor NLB health as well as the health of the computing nodes of a computing cluster (e.g., the computing instance(s) 132 of FIG. 1).

To create a set of NLBs, routing instance(s) 420 may receive a NLB request and forward the request to the NLB API service 422. NLB API Service 422 can handle NLB resource provisioning with asynchronous handling using WFaaS 424 and a work request model. NLB API Service 422 can communicate with NLB HAS(s) 414 to configure the probes. Before provisioning one or more NLBs, the NLB API service 422 may be configured to verify that the NLB HAS(s) 414 have capacity to run probes of the number of NLB backends requested. NLB API service 422 may utilize limits 436 (e.g., a service for enforcing resource limits) to enforce any suitable predefined resource limits. NLB API service 422 may utilize authorization service 428 to perform any suitable authentication operations related to the request. The NLB API service 422 may push an NLB object to data store 430 for each NLB to be created. The NLB object may be persisted in data store 430 and may be accessible by the NLB distributed service 432 which may be used to provide the data included in the NLB object to the NLB agent 408 at any suitable time. Any subsequent updates for an NLB backend may be received by the NLB API service 422 and stored in the corresponding NLB object within data store 430. The NLB agent 408 and/or NLB distributed service 432 may be configured to retrieve those updates at any suitable time. The retrieved data may be provided by the NLB agent 408 to the NLB backend 402 through the NLB module 406. Similarly, the NLB HAS(s) 414 may retrieve any suitable data from the NLB object(s) at any suitable time.

Continuing on, the NLB API service 422 may call the VCN Control Plane (CP) 434 using a call to APIs exposed by the VCN CP 434. The VCN CP 434 may perform any suitable operations for configuring any suitable number of service VNICs of the VNICaaS instance(s) 404. Additionally, the VCN CP 434 may perform any suitable operations to send information related to the service VNIC(s) into the NLB backends (e.g., including NLB backend 402).

It should be appreciated that NLB HAS(s) 414 may correspond to a single availability domain and that a separate NLB HA Fleet Service (not depicted) may be utilized to maintain multiple HA distributed services, where each HA distributed service (e.g., of which NLB HAS(s) 414 is an example) corresponds to a single availability domain.

Figure 5:
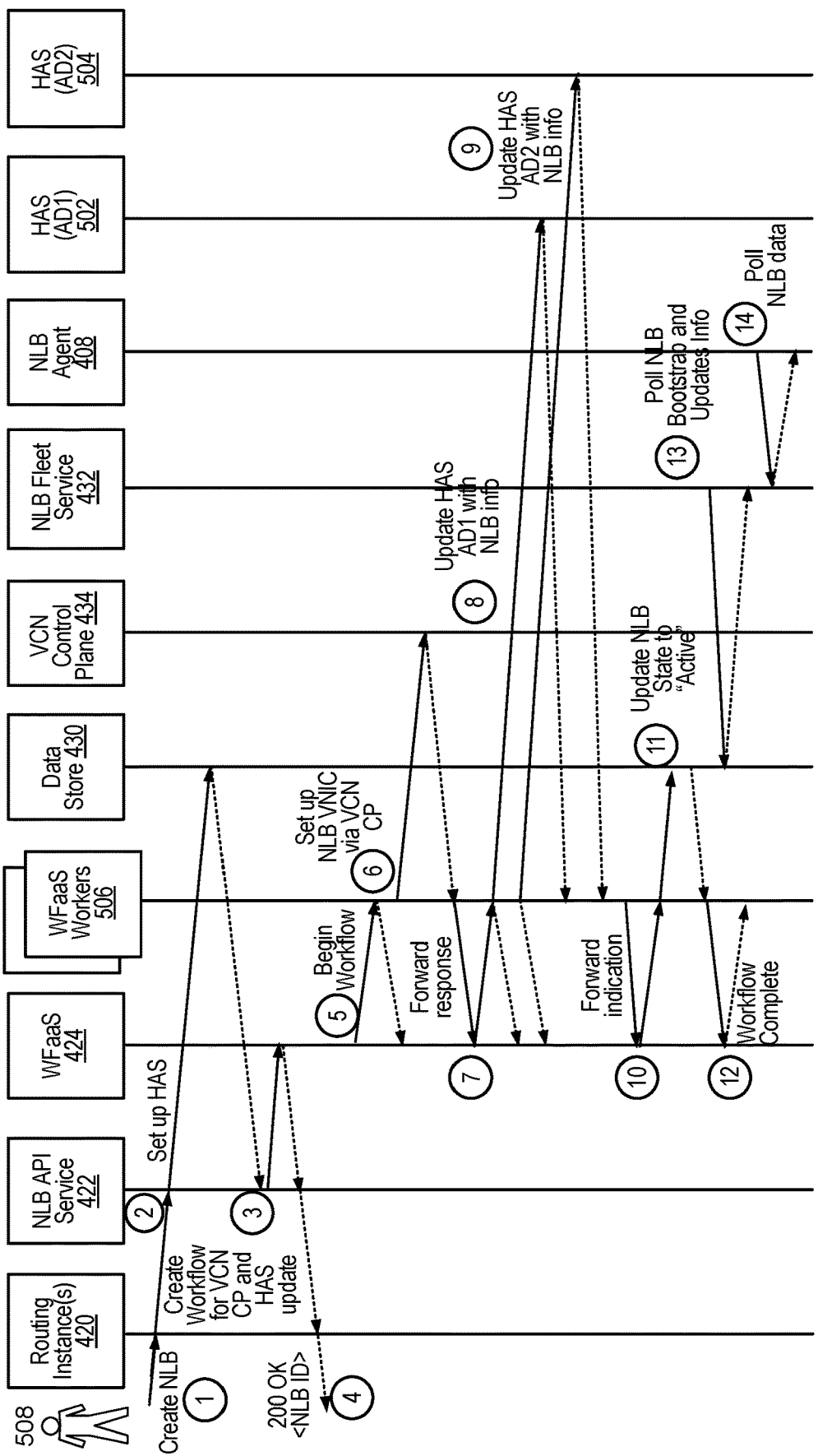
FIG. 5 illustrates an example flow for updating health assessment data with respect to multiple availability domains, in accordance with at least one embodiment.

FIG. 5 illustrates an example flow for updating health assessment data corresponding to a network load balancer with respect to multiple availability domains (e.g., AD1 and AD2), in accordance with at least one embodiment.

As can be seen in FIG. 5, separate processes or threads (e.g., WFaaS) may be utilized to report health assessment data for instances to multiple health assessment control planes (HA CP) (e.g., different sets of HAS(s) 414, where each HAS is considered an HA CP) depending on the availability domain of the instance(s). For example, an NLB (a corresponding VNICaaS instance) may be configured with multiple HA applications. One HA application may correspond to AD1 and another HA application may correspond to AD2. Likewise, One HAS (e.g., HAS (AD1) 502) may correspond to AD1 and another HAS (e.g., HAS (AD1) 504) may correspond to AD2.

At step 1, a NLB may be created using the operations described above in connection with FIG. 4. For example, a request for creating a number of NLBs can be forwarded to the NLB API service 422.

At step 2, the NLB API service 422 can execute operations to create a record within data store 430 to store data related to each requested NLB. A status for each NLB record may be set to a value indicating the NLB is in the process of being created.

At step 3, the data store 430 may transmit a response to the NLB API service 422 confirming that configuration data has been stored. In response, the NLB API service 422 may create a workflow for VCN CP 434 and an HAS update and send the workflows to WFaaS 424 to be performed by one or more WFaaS workers (e.g., WFaaS workers 506).

At step 4, upon completing the workflow (e.g., steps 5-12) the WFaaS 424 may transmit data to the NLB API service 422, and/or the routing instance(s) 420 to be displayed to the user 508 (e.g., the user who submitted the request at step 1). In some embodiments, the data may include a code (e.g., "200 OK" indicating successful creation of the NLB) and an identifier for the NLBs (e.g., an NLB ID for each NLB created).

At step 5, the WFaaS 424 may begin execution of the workflow provided at step 3. A response may be transmitted back to the WFaaS 424 indicating the workflow has begun. The WFaaS 424 may instantiate any suitable number of WFaaS workers 506. At step 6, each of the WFaaS workers 506 may transmit instructions/data to the VNIC CP 434 to set up a corresponding VNICaaS instance for each NLB requested. Each worker may receive a response from the VNIC CP 434 which it may then forward to the WFaaS 424 at step 7.

At steps 8 and 9, a WFaaS worker may perform separate operations for initializing an HAS for each availability domain. For example, at step 8, a WFaaS worker may update an HAS corresponding to AD1 (e.g., HAS (AD1) 502) with information related to a particular NLB operating in AD1. A response may be transmitted to the WFaaS that the HAS for AD1 was successfully or unsuccessfully updated with the NLB information. At step 9, a WFaaS worker may update an HAS corresponding to AD2 (e.g., HAS (AD1) 504) with information related to the same NLB that is also operating in AD2. The WFaaS may receive a response from a corresponding worker indicating that the HAS for AD2 was successfully or unsuccessfully updated with the NLB information.

At step 10, data may be forwarded from the WFaaS workers 506 to the WFaaS 424 indicating that the HASs for AD1 and AD2 have been updated with the information corresponding to the NLB.

At step 11, the WFaaS 424 may execute operations to cause each worker to update the data store 430 record corresponding to the NLB to a value indicating the NLB is active.

At step 12, the data store 430 may provide a response to the worker which in turn may provide a response to the WFaaS 424 indicating the status of the NLB is complete and the WFaaS may transmit data to the WFaaS workers 506 indicating the workflow is complete.

At step 13, the NLB Fleet Service 432 may poll the data store 430 at any suitable time for bootstrap and/or update information corresponding to the NLB. At step 14, the agent operating on the NLB (e.g., NLB agent 408) may poll the NLB Fleet Service 432 at any suitable time for NLB data (e.g., bootstrap data and/or NLB updates).

Figure 6:
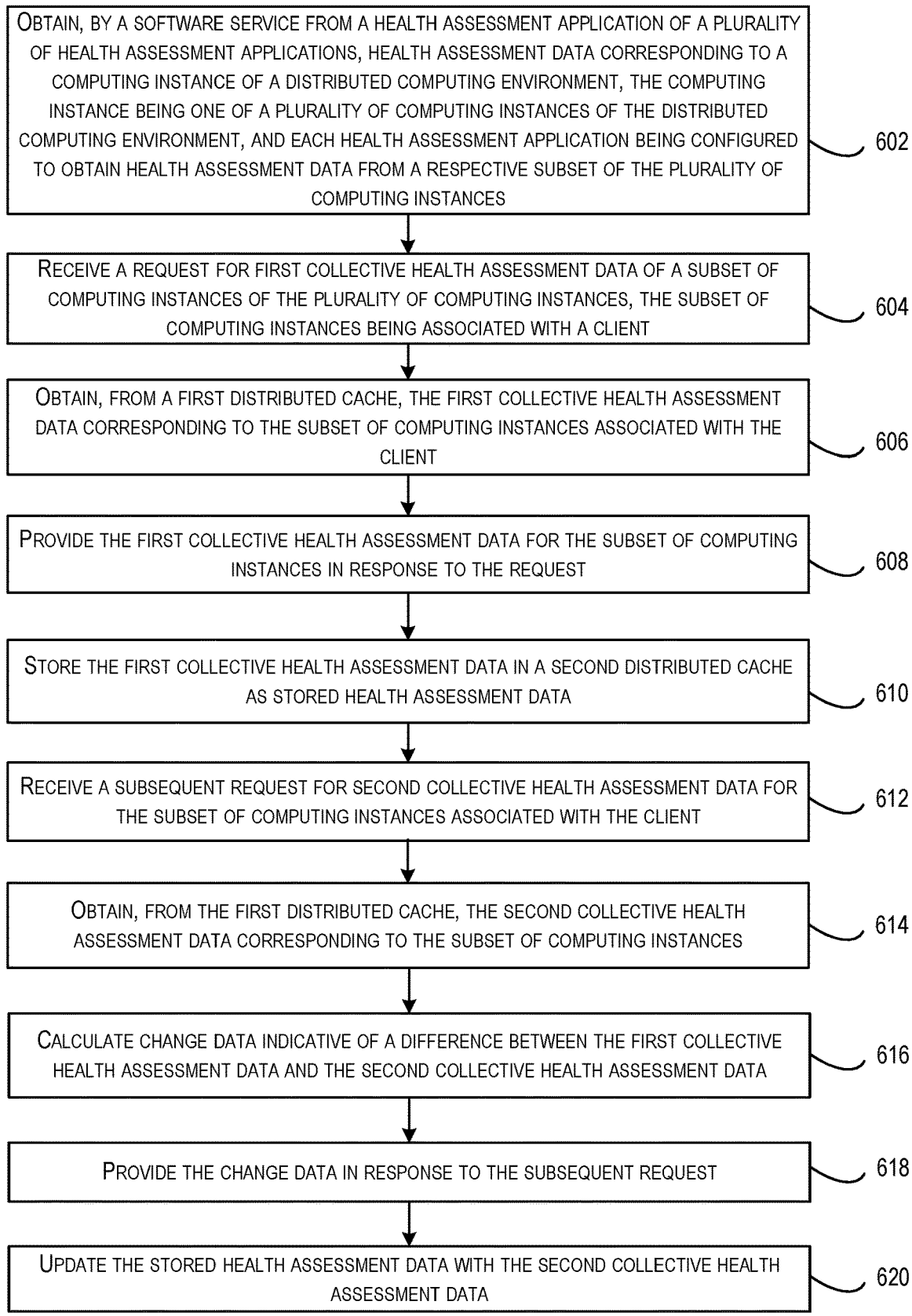
FIG. 6 illustrates a block diagram depicting a method for obtaining health assessment data, according to at least one embodiment.

FIG. 6 illustrates a block diagram depicting a method 600 for obtaining health assessment HA data (e.g., HA data corresponding to a number of computing instances/nodes of a computing cluster such as computing instance(s) 132 of FIG. 1), according to at least one embodiment. The method 600 may be performed by a distributed health assessment service (e.g., the HASs 102-106 of FIG. 1, the HAS(s) 210-214 of FIG. 2, etc.). In some embodiments, method 600 may be performed after identifiers for a particular set of computing instances are provided (by the HAS via an agent) to a health assessment application, which causes the health assessment application to probe each of the particular set of computing instances for its corresponding state. In some embodiments, the set of computing instances to be probed by a particular health assessment application may be determined by the software service (the distributed HA service) based at least in part on an estimated resource consumption for obtaining the health assessment data corresponding to set of computing instances and an available compute resource capacity of a computing component hosting the particular health assessment application.

The method 600 may begin at 602, where health assessment data corresponding to a computing instance of a distributed computing environment (e.g., a computing instance/node of the computing instance(s) 132) may be obtained by a software service (HAS) (e.g., HAS 102 of FIG. 1) from a health assessment application (e.g., one of the HA applications operating at HAS DP 126 of FIG. 1). In this example, the health assessment application may include the HA agent and/or the HAAs of FIG. 11. In some embodiments, the computing instance is one of a plurality of computing instances of the distributed computing environment (e.g., one of the computing instances/nodes of computing instance(s) 132, wherein the instances/nodes of computing instance(s) 132 are associated with a common pod identifier). In some embodiments, each health assessment application is configured to obtain health assessment data from a respective subset (e.g., one, two, etc.) of the plurality of computing instances.

At 604, a request (e.g., the request received at step 1 of FIG. 3) for first collective health assessment data of a subset (e.g., a pod associated with a client) of the plurality of computing instances may be received. The subset of computing instance may be associated with a client (e.g., client 1). In some embodiments, the request may be received by a RPC thread (e.g., RPC thread 330 of FIG. 3). In some embodiments, the receiving component (e.g., the RPC thread 330) may identify (e.g., from the pod cache 324 of FIG. 3) the set of one or more computing instances using a pod identifier provided in the request. For example, an ID for each instance associated with a pod may be retrieved from the pod cache 324 of FIG. 3 using a pod identifier. In some embodiments, the first collective health assessment data may include respective health assessment data of each of the set of one or more computing instances (e.g., the HA data at time T1).

At 606, first collective health assessment data (e.g., health assessment data for each instance indicated in the request by instance identifier and/or pod identifier) may be obtained (e.g., by the RPC thread 330) from a first distributed cache (HC data cache 312 of FIG. 3). In some embodiments, the first distributed cache comprises an instance of health assessment data obtained by a first health assessment application, second health assessment data obtained by a second health assessment application, and overall health assessment data for the instance calculated from the first health assessment data and the second health assessment data (see table 1 discussed above). The first collective health assessment data corresponds to the subset of computing instances associated with the client. In some embodiments, the subset of computing instances can be identified from a third distributed cache (e.g., pod cache 324 of FIG. 3) based at least in part on an identifier associated with an entity (e.g., a pod ID associated with a client) associated with the request.

At 608, the first collective health assessment data for the subset of computing instances may be provided (e.g., from the RPC thread 330 to client 1 (e.g., to a client device associated with client 1)) in response to the request.

At 610, the first collective health assessment data may be stored (e.g., by the RPC thread 330) in a second distributed cache (e.g., the CLSS cache 332 of FIG. 3) as stored health assessment data. In some embodiments, storing the first collective health assessment data in the second distributed cache as the stored health assessment data is performed based at least in part on receiving an indication (e.g., an indication from the client 1) that the first collective health assessment data has been received.

At 612, a subsequent request for second collective health assessment data for the subset of computing instances associated with the client may be received (e.g., by a RPC thread 334 of FIG. 3 from a client device such as client 1 of FIG. 3). By way of example, the second collective health assessment data may include respective health assessment data of each of the set of one or more computing instances at time T2. In some embodiments, time T2 may occur after time T1.

At 614, second collective health assessment data corresponding to the subset of computing instances may be obtained (e.g., by the receiving RPC thread 334) from the first distributed cache (e.g., the HC data cache(s) 312).

At 616, change data indicative of a difference between the first collective health assessment data and the second collective health assessment data is calculated (e.g., by the RPC thread 334).

At 618, the change data is provided (e.g., by the RPC thread 334 to the client 1) in response to the subsequent request.

At 620, the stored health assessment data is updated (e.g., by the RPC thread 334) with the second collective health assessment data (e.g., the second collective health assessment data is used to update the last seen data of CLSS cache 332 for each instance of the pod as described at step 9 and 10 of FIG. 3).

In at least one embodiment, the method 600 further comprises maintaining application health assessment data for each of the plurality of health assessment applications in a fourth distributed cache. In some embodiments, the fourth distributed cache can be the same or different from the HA data cache 312 of FIG. 3.

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like. In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
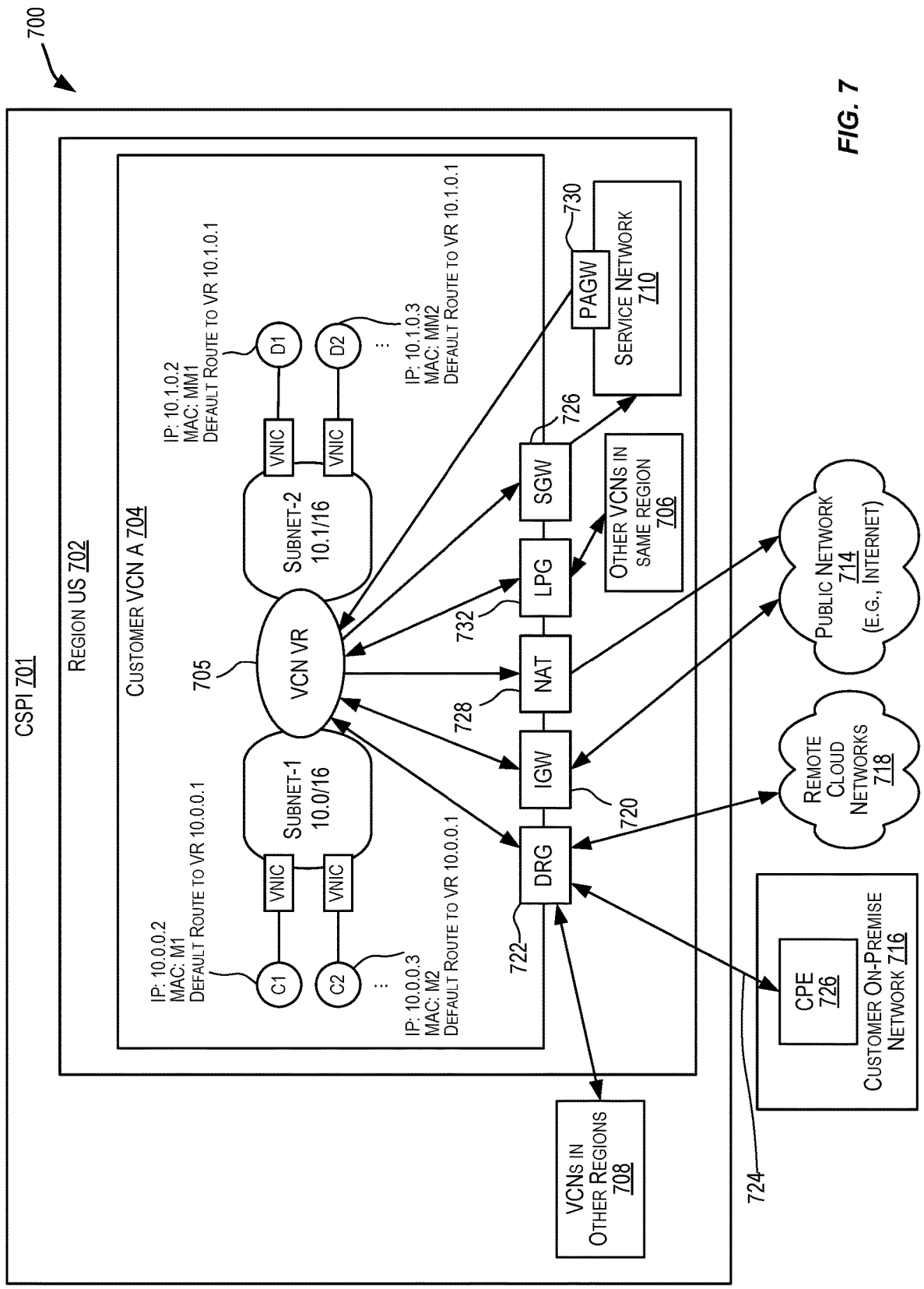
FIG. 7 is a high level diagram of a distributed environment showing a virtual or overlay cloud network hosted by a cloud service provider infrastructure according to certain embodiments.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Memory that may be desired to be stored by the request can be stored in the DB subnet(s) 730.

In some examples, the data plane minor app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
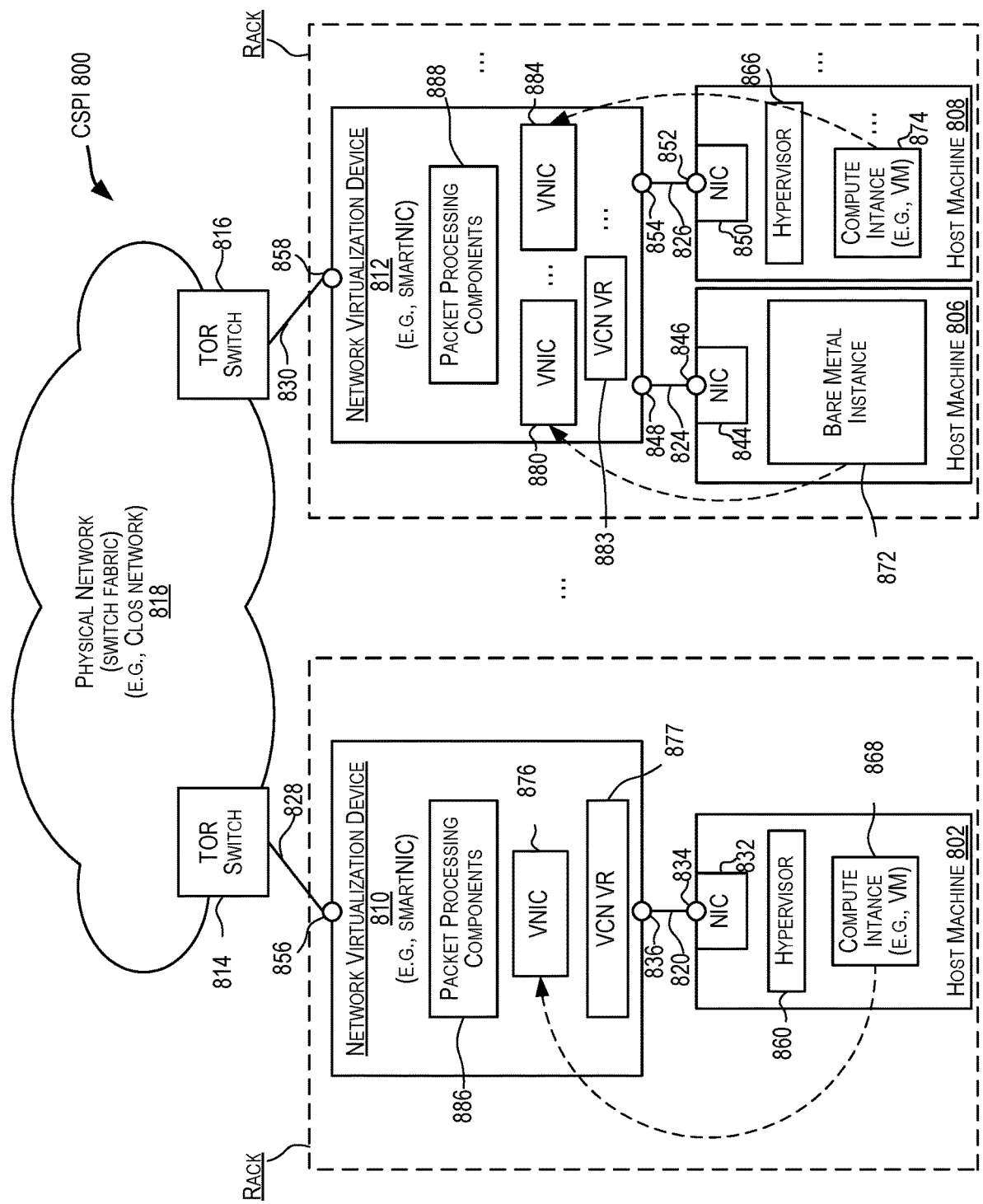
FIG. 8 depicts a simplified architectural diagram of the physical components in the physical network within a cloud services provider infrastructure (CSPI) according to certain embodiments.

FIG. 8 is a block diagram 800 illustrating another example pattern of an IaaS architecture, according to at least one embodiment. Service operators 802 (e.g. service operators 702 of FIG. 7) can be communicatively coupled to a secure host tenancy 804 (e.g. the secure host tenancy 704 of FIG. 7) that can include a virtual cloud network (VCN) 806 (e.g. the VCN 706 of FIG. 7) and a secure host subnet 808 (e.g. the secure host subnet 708 of FIG. 7). The VCN 806 can include a local peering gateway (LPG) 810 (e.g. the LPG 710 of FIG. 7) that can be communicatively coupled to a secure shell (SSH) VCN 812 (e.g. the SSH VCN 712 of FIG. 7) via an LPG 710 contained in the SSH VCN 812. The SSH VCN 812 can include an SSH subnet 814 (e.g. the SSH subnet 714 of FIG. 7), and the SSH VCN 812 can be communicatively coupled to a control plane VCN 816 (e.g. the control plane VCN 716 of FIG. 7) via an LPG 810 contained in the control plane VCN 816. The control plane VCN 816 can be contained in a service tenancy 819 (e.g. the service tenancy 719 of FIG. 7), and the data plane VCN 818 (e.g. the data plane VCN 718 of FIG. 7) can be contained in a customer tenancy 821 that may be owned or operated by users, or customers, of the system.

The control plane VCN 816 can include a control plane DMZ tier 820 (e.g. the control plane DMZ tier 720 of FIG. 7) that can include LB subnet(s) 822 (e.g. LB subnet(s) 722 of FIG. 7), a control plane app tier 824 (e.g. the control plane app tier 724 of FIG. 7) that can include app subnet(s) 826 (e.g. app subnet(s) 726 of FIG. 7), a control plane data tier 828 (e.g. the control plane data tier 728 of FIG. 7) that can include database (DB) subnet(s) 830 (e.g. similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g. the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g. the service gateway of FIG. 7) and a network address translation (NAT) gateway 838 (e.g. the NAT gateway 738 of FIG. 7). The control plane VCN 816 can include the service gateway 836 and the NAT gateway 838.

The control plane VCN 816 can include a data plane mirror app tier 840 (e.g. the data plane mirror app tier 740 of FIG. 7) that can include app subnet(s) 826. The app subnet(s) 826 contained in the data plane mirror app tier 840 can include a virtual network interface controller (VNIC) 842 (e.g. the VNIC of 742) that can execute a compute instance 844 (e.g. similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g. the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g. the metadata management service 752 of FIG. 7) that can be communicatively coupled to public Internet 854 (e.g. public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g. cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
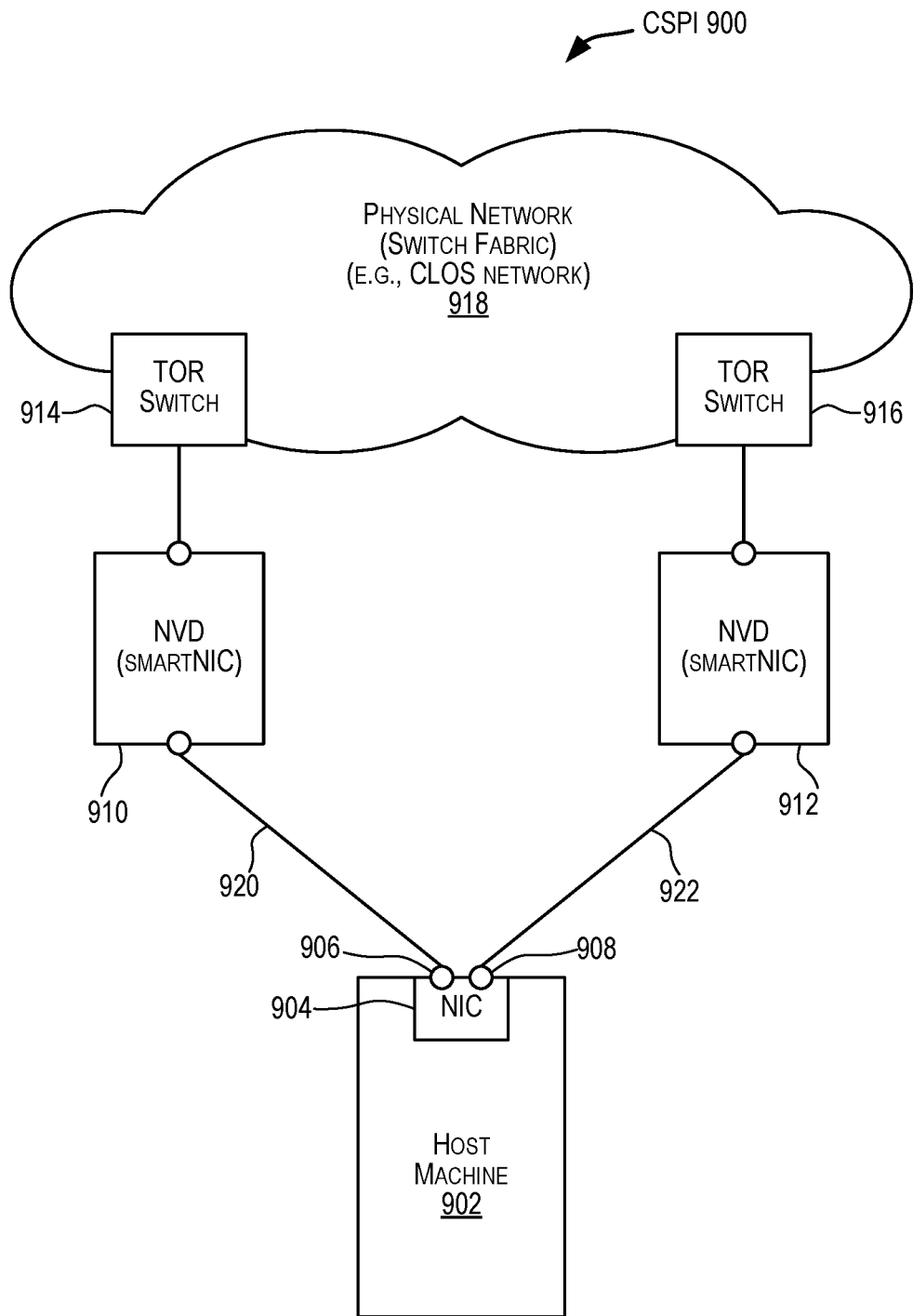
FIG. 9 shows an example arrangement within CSPI where a host machine is connected to multiple network virtualization devices (NVDs) according to certain embodiments.

FIG. 9 is a block diagram 900 illustrating another example pattern of an IaaS architecture, according to at least one embodiment. Service operators 902 (e.g. service operators 702 of FIG. 7) can be communicatively coupled to a secure host tenancy 904 (e.g. the secure host tenancy 704 of FIG. 7) that can include a virtual cloud network (VCN) 906 (e.g. the VCN 706 of FIG. 7) and a secure host subnet 908 (e.g. the secure host subnet 708 of FIG. 7). The VCN 906 can include an LPG 910 (e.g. the LPG 710 of FIG. 7) that can be communicatively coupled to an SSH VCN 912 (e.g. the SSH VCN 712 of FIG. 7) via an LPG 910 contained in the SSH VCN 912. The SSH VCN 912 can include an SSH subnet 914 (e.g. the SSH subnet 714 of FIG. 7), and the SSH VCN 912 can be communicatively coupled to a control plane VCN 916 (e.g. the control plane VCN 716 of FIG. 7) via an LPG 910 contained in the control plane VCN 916 and to a data plane VCN 918 (e.g. the data plane 718 of FIG. 7) via an LPG 910 contained in the data plane VCN 918. The control plane VCN 916 and the data plane VCN 918 can be contained in a service tenancy 919 (e.g. the service tenancy 719 of FIG. 7).

The control plane VCN 916 can include a control plane DMZ tier 920 (e.g. the control plane DMZ tier 720 of FIG. 7) that can include load balancer (LB) subnet(s) 922 (e.g. LB subnet(s) 722 of FIG. 7), a control plane app tier 924 (e.g. the control plane app tier 724 of FIG. 7) that can include app subnet(s) 926 (e.g. similar to app subnet(s) 726 of FIG. 7), a control plane data tier 928 (e.g. the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g. the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 7) and a network address translation (NAT) gateway 938 (e.g. the NAT gateway 738 of FIG. 7). The control plane VCN 916 can include the service gateway 936 and the NAT gateway 938.

The data plane VCN 918 can include a data plane app tier 946 (e.g. the data plane app tier 746 of FIG. 7), a data plane DMZ tier 948 (e.g. the data plane DMZ tier 748 of FIG. 7), and a data plane data tier 950 (e.g. the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g. public Internet 754 of FIG. 7).

The Internet gateway 934 contained in the control plane VCN 916 and contained in the data plane VCN 918 can be communicatively coupled to a metadata management service 952 (e.g. the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
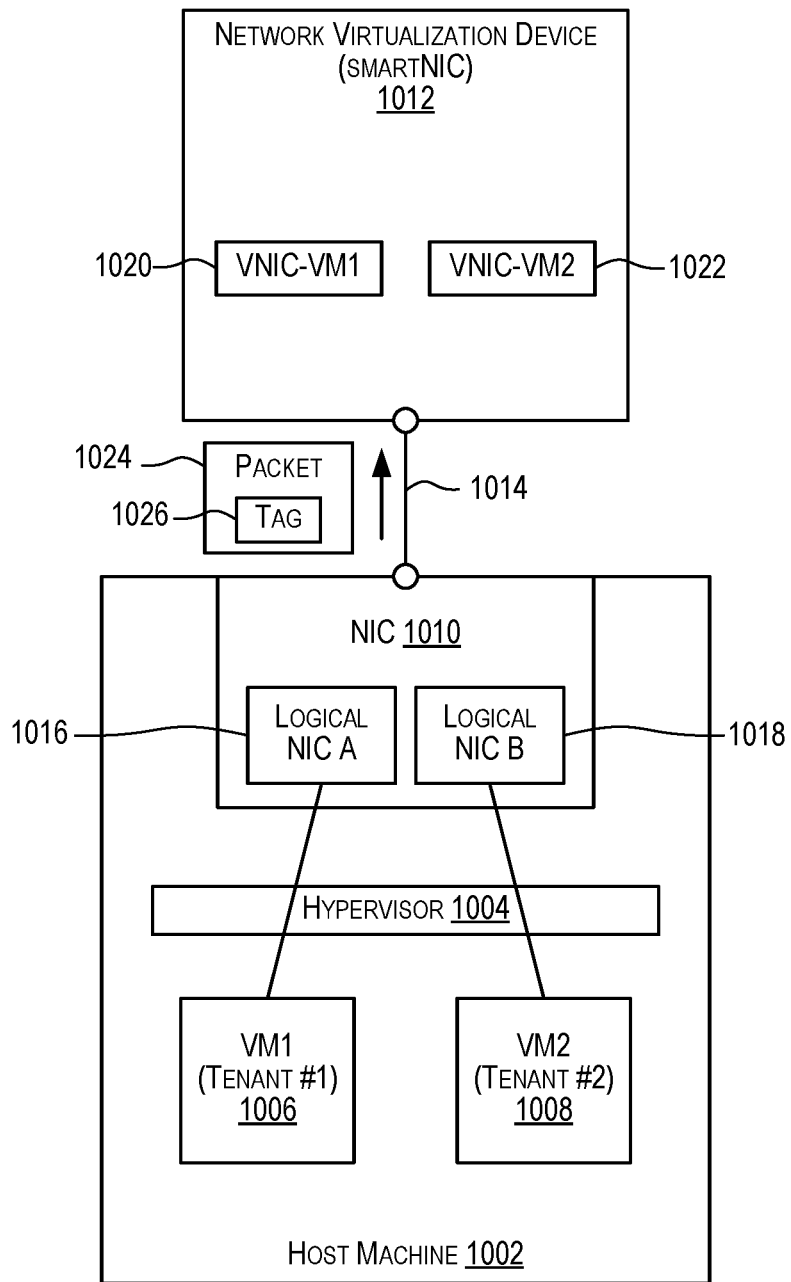
FIG. 10 depicts connectivity between a host machine and an NVD for providing I/O virtualization for supporting multitenancy according to certain embodiments.

FIG. 10 is a block diagram 1000 illustrating another example pattern of an IaaS architecture, according to at least one embodiment. Service operators 1002 (e.g. service operators 702 of FIG. 7) can be communicatively coupled to a secure host tenancy 1004 (e.g. the secure host tenancy 704 of FIG. 7) that can include a virtual cloud network (VCN) 1006 (e.g. the VCN 706 of FIG. 7) and a secure host subnet 1008 (e.g. the secure host subnet 708 of FIG. 7). The VCN 1006 can include an LPG 1010 (e.g. the LPG 710 of FIG. 7) that can be communicatively coupled to an SSH VCN 1012 (e.g. the SSH VCN 712 of FIG. 7) via an LPG 1010 contained in the SSH VCN 1012. The SSH VCN 1012 can include an SSH subnet 1014 (e.g. the SSH subnet 714 of FIG. 7), and the SSH VCN 1012 can be communicatively coupled to a control plane VCN 1016 (e.g. the control plane VCN 716 of FIG. 7) via an LPG 1010 contained in the control plane VCN 1016 and to a data plane VCN 1018 (e.g. the data plane 718 of FIG. 7) via an LPG 1010 contained in the data plane VCN 1018. The control plane VCN 1016 and the data plane VCN 1018 can be contained in a service tenancy 1019 (e.g. the service tenancy 719 of FIG. 7).

The control plane VCN 1016 can include a control plane DMZ tier 1020 (e.g. the control plane DMZ tier 720 of FIG. 7) that can include LB subnet(s) 1022 (e.g. LB subnet(s) 722 of FIG. 7), a control plane app tier 1024 (e.g. the control plane app tier 724 of FIG. 7) that can include app subnet(s) 1026 (e.g. app subnet(s) 726 of FIG. 7), a control plane data tier 1028 (e.g. the control plane data tier 728 of FIG. 7) that can include DB subnet(s) 1030 (e.g. DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 7) and a network address translation (NAT) gateway 1038 (e.g. the NAT gateway 738 of FIG. 7). The control plane VCN 1016 can include the service gateway 1036 and the NAT gateway 1038.

The data plane VCN 1018 can include a data plane app tier 1046 (e.g. the data plane app tier 746 of FIG. 7), a data plane DMZ tier 1048 (e.g. the data plane DMZ tier 748 of FIG. 7), and a data plane data tier 1050 (e.g. the data plane data tier 750 of FIG. 7). The data plane DMZ tier 1048 can include LB subnet(s) 1022 that can be communicatively coupled to trusted app subnet(s) 1060 (e.g. trusted app subnet(s) 960 of FIG. 9) and untrusted app subnet(s) 1062 (e.g. untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g. public Internet 754 of FIG. 7).

The Internet gateway 1034 contained in the control plane VCN 1016 and contained in the data plane VCN 1018 can be communicatively coupled to a metadata management service 1052 (e.g. the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
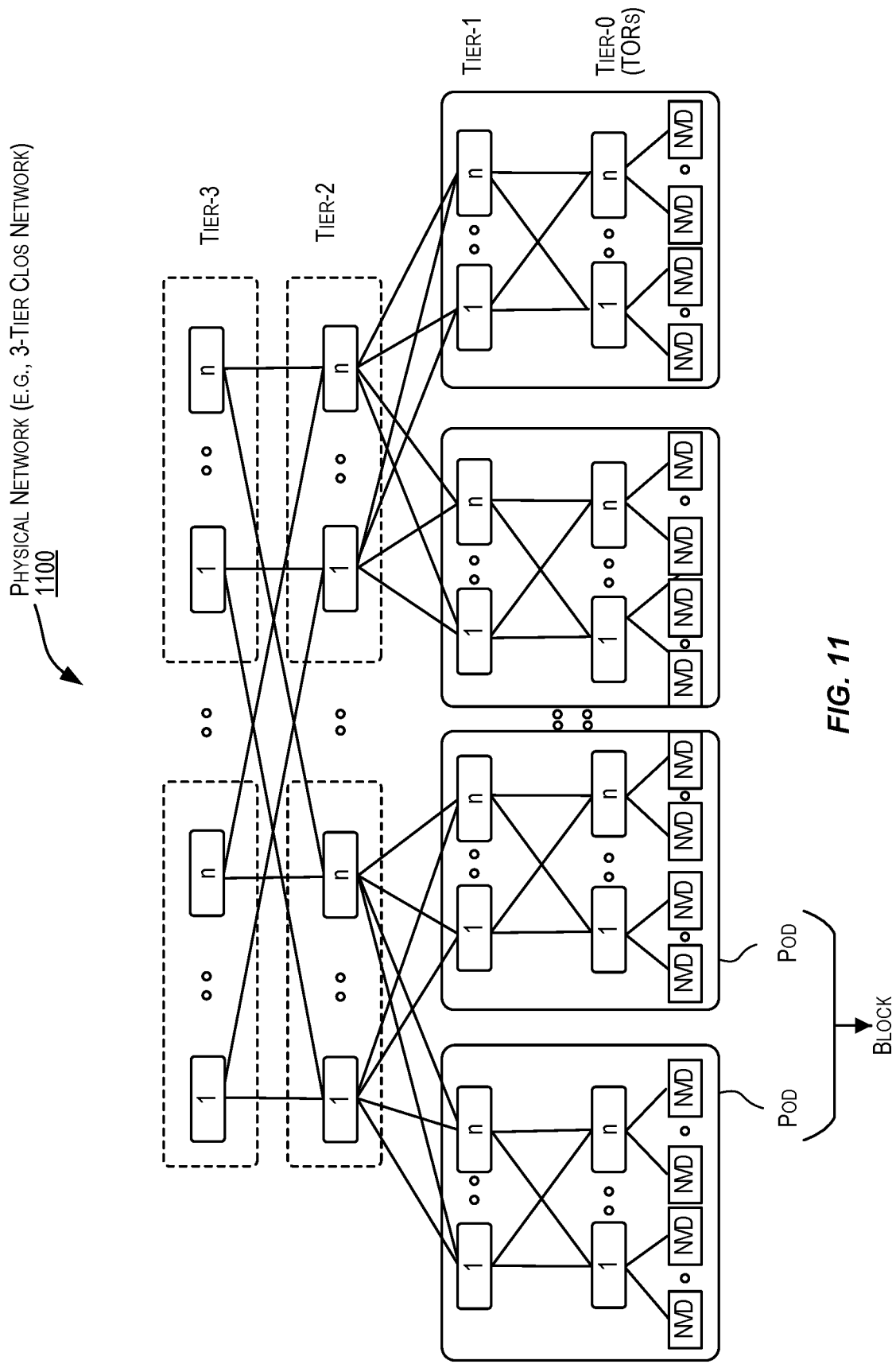
FIG. 11 depicts a simplified block diagram of a physical network provided by a CSPI according to certain embodiments.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118, and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 11 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like. In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 12:
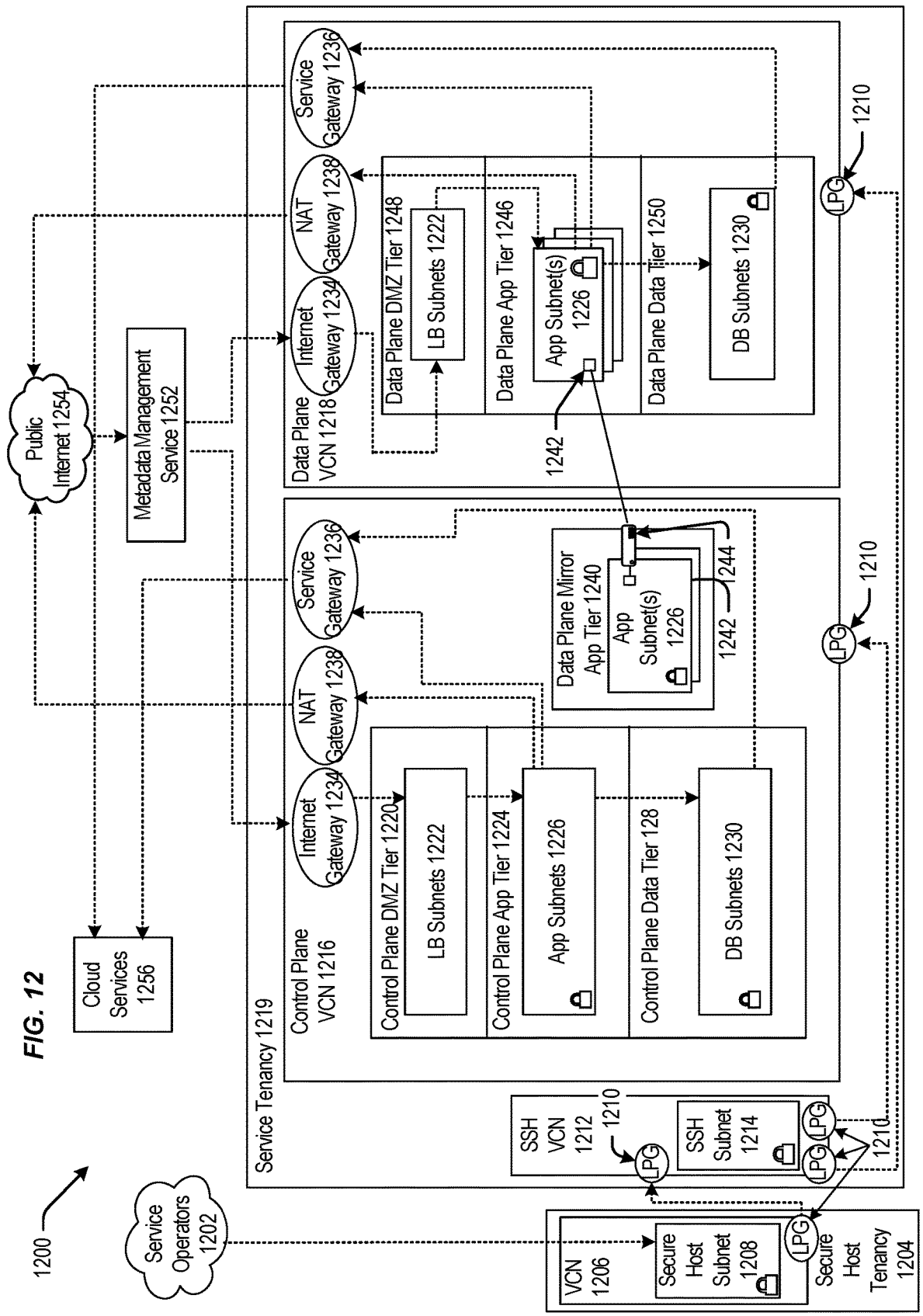
FIG. 12 is a block diagram illustrating one pattern for implementing a cloud infrastructure as a service system, according to at least one embodiment.

FIG. 12 is a block diagram 1200 illustrating an example pattern of an IaaS architecture, according to at least one embodiment. Service operators 1202 can be communicatively coupled to a secure host tenancy 1204 that can include a virtual cloud network (VCN) 1206 and a secure host subnet 1208. In some examples, the service operators 1202 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1206 and/or the Internet.

The VCN 1206 can include a local peering gateway (LPG) 1210 that can be communicatively coupled to a secure shell (SSH) VCN 1212 via an LPG 1210 contained in the SSH VCN 1212. The SSH VCN 1212 can include an SSH subnet 1214, and the SSH VCN 1212 can be communicatively coupled to a control plane VCN 1216 via the LPG 1210 contained in the control plane VCN 1216. Also, the SSH VCN 1212 can be communicatively coupled to a data plane VCN 1218 via an LPG 1210. The control plane VCN 1216 and the data plane VCN 1218 can be contained in a service tenancy 1219 that can be owned and/or operated by the IaaS provider.

The control plane VCN 1216 can include a control plane demilitarized zone (DMZ) tier 1220 that acts as a perimeter network (e.g., portions of a corporate network between the corporate intranet and external networks). The DMZ-based servers may have restricted responsibilities and help keep security breaches contained. Additionally, the DMZ tier 1220 can include one or more load balancer (LB) subnet(s) 1222, a control plane app tier 1224 that can include app subnet(s) 1226, a control plane data tier 1228 that can include database (DB) subnet(s) 1230 (e.g., frontend DB subnet(s) and/or backend DB subnet(s)). The LB subnet(s) 1222 contained in the control plane DMZ tier 1220 can be communicatively coupled to the app subnet(s) 1226 contained in the control plane app tier 1224 and an Internet gateway 1234 that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238. The control plane VCN 1216 can include the service gateway 1236 and the NAT gateway 1238.

The control plane VCN 1216 can include a data plane mirror app tier 1240 that can include app subnet(s) 1226. The app subnet(s) 1226 contained in the data plane mirror app tier 1240 can include a virtual network interface controller (VNIC) 1242 that can execute a compute instance 1244. The compute instance 1244 can communicatively couple the app subnet(s) 1226 of the data plane mirror app tier 1240 to app subnet(s) 1226 that can be contained in a data plane app tier 1246.

The data plane VCN 1218 can include the data plane app tier 1246, a data plane DMZ tier 1248, and a data plane data tier 1250. The data plane DMZ tier 1248 can include LB subnet(s) 1222 that can be communicatively coupled to the app subnet(s) 1226 of the data plane app tier 1246 and the Internet gateway 1234 of the data plane VCN 1218. The app subnet(s) 1226 can be communicatively coupled to the service gateway 1236 of the data plane VCN 1218 and the NAT gateway 1238 of the data plane VCN 1218. The data plane data tier 1250 can also include the DB subnet(s) 1230 that can be communicatively coupled to the app subnet(s) 1226 of the data plane app tier 1246.

The Internet gateway 1234 of the control plane VCN 1216 and of the data plane VCN 1218 can be communicatively coupled to a metadata management service 1252 that can be communicatively coupled to public Internet 1254. Public Internet 1254 can be communicatively coupled to the NAT gateway 1238 of the control plane VCN 1216 and of the data plane VCN 1218. The service gateway 1236 of the control plane VCN 1216 and of the data plane VCN 1218 can be communicatively couple to cloud services 1256.

In some examples, the service gateway 1236 of the control plane VCN 1216 or of the data plan VCN 1218 can make application programming interface (API) calls to cloud services 1256 without going through public Internet 1254. The API calls to cloud services 1256 from the service gateway 1236 can be one-way: the service gateway 1236 can make API calls to cloud services 1256, and cloud services 1256 can send requested data to the service gateway 1236. But, cloud services 1256 may not initiate API calls to the service gateway 1236.

In some examples, the secure host tenancy 1204 can be directly connected to the service tenancy 1219, which may be otherwise isolated. The secure host subnet 1208 can communicate with the SSH subnet 1214 through an LPG 1210 that may enable two-way communication over an otherwise isolated system. Connecting the secure host subnet 1208 to the SSH subnet 1214 may give the secure host subnet 1208 access to other entities within the service tenancy 1219.

The control plane VCN 1216 may allow users of the service tenancy 1219 to set up or otherwise provision desired resources. Desired resources provisioned in the control plane VCN 1216 may be deployed or otherwise used in the data plane VCN 1218. In some examples, the control plane VCN 1216 can be isolated from the data plane VCN 1218, and the data plane mirror app tier 1240 of the control plane VCN 1216 can communicate with the data plane app tier 1246 of the data plane VCN 1218 via VNICs 1242 that can be contained in the data plane mirror app tier 1240 and the data plane app tier 1246.

In some examples, users of the system, or customers, can make requests, for example create, read, update, or delete (CRUD) operations, through public Internet 1254 that can communicate the requests to the metadata management service 1252. The metadata management service 1252 can communicate the request to the control plane VCN 1216 through the Internet gateway 1234. The request can be received by the LB subnet(s) 1222 contained in the control plane DMZ tier 1220. The LB subnet(s) 1222 may determine that the request is valid, and in response to this determination, the LB subnet(s) 1222 can transmit the request to app subnet(s) 1226 contained in the control plane app tier 1224. If the request is validated and requires a call to public Internet 1254, the call to public Internet 1254 may be transmitted to the NAT gateway 1238 that can make the call to public Internet 1254. Memory that may be desired to be stored by the request can be stored in the DB subnet(s) 1230.

In some examples, the data plane mirror app tier 1240 can facilitate direct communication between the control plane VCN 1216 and the data plane VCN 1218. For example, changes, updates, or other suitable modifications to configuration may be desired to be applied to the resources contained in the data plane VCN 1218. Via a VNIC 1242, the control plane VCN 1216 can directly communicate with, and can thereby execute the changes, updates, or other suitable modifications to configuration to, resources contained in the data plane VCN 1218.

In some embodiments, the control plane VCN 1216 and the data plane VCN 1218 can be contained in the service tenancy 1219. In this case, the user, or the customer, of the system may not own or operate either the control plane VCN 1216 or the data plane VCN 1218. Instead, the IaaS provider may own or operate the control plane VCN 1216 and the data plane VCN 1218, both of which may be contained in the service tenancy 1219. This embodiment can enable isolation of networks that may prevent users or customers from interacting with other users', or other customers', resources. Also, this embodiment may allow users or customers of the system to store databases privately without needing to rely on public Internet 1254, which may not have a desired level of security, for storage.

In other embodiments, the LB subnet(s) 1222 contained in the control plane VCN 1216 can be configured to receive a signal from the service gateway 1236. In this embodiment, the control plane VCN 1216 and the data plane VCN 1218 may be configured to be called by a customer of the IaaS provider without calling public Internet 1254. Customers of the IaaS provider may desire this embodiment since database(s) that the customers use may be controlled by the IaaS provider and may be stored on the service tenancy 1219, which may be isolated from public Internet 1254.

Figure 13:
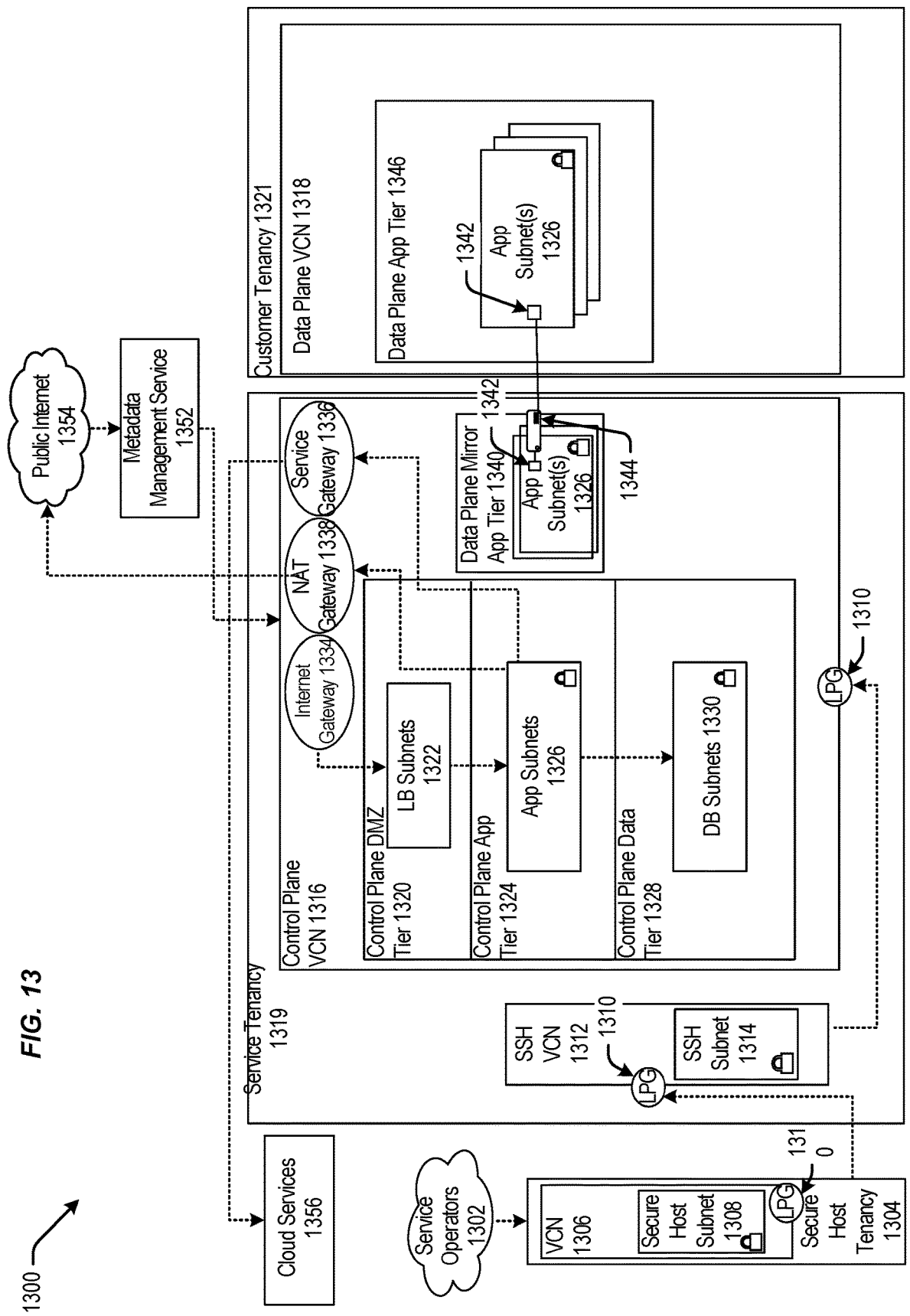
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g. service operators 1202 of FIG. 12) can be communicatively coupled to a secure host tenancy 1304 (e.g. the secure host tenancy 1204 of FIG. 12) that can include a virtual cloud network (VCN) 1306 (e.g. the VCN 1206 of FIG. 12) and a secure host subnet 1308 (e.g. the secure host subnet 1208 of FIG. 12). The VCN 1306 can include a local peering gateway (LPG) 1310 (e.g. the LPG 1210 of FIG. 12) that can be communicatively coupled to a secure shell (SSH) VCN 1312 (e.g. the SSH VCN 1212 of FIG. 12) via an LPG 1210 contained in the SSH VCN 1312. The SSH VCN 1312 can include an SSH subnet 1314 (e.g. the SSH subnet 1214 of FIG. 12), and the SSH VCN 1312 can be communicatively coupled to a control plane VCN 1316 (e.g. the control plane VCN 1216 of FIG. 12) via an LPG 1310 contained in the control plane VCN 1316. The control plane VCN 1316 can be contained in a service tenancy 1319 (e.g. the service tenancy 1219 of FIG. 12), and the data plane VCN 1318 (e.g. the data plane VCN 1218 of FIG. 12) can be contained in a customer tenancy 1321 that may be owned or operated by users, or customers, of the system.

The control plane VCN 1316 can include a control plane DMZ tier 1320 (e.g. the control plane DMZ tier 1220 of FIG. 12) that can include LB subnet(s) 1322 (e.g. LB subnet(s) 1222 of FIG. 12), a control plane app tier 1324 (e.g. the control plane app tier 1224 of FIG. 12) that can include app subnet(s) 1326 (e.g. app subnet(s) 1226 of FIG. 12), a control plane data tier 1328 (e.g. the control plane data tier 1228 of FIG. 12) that can include database (DB) subnet(s) 1330 (e.g. similar to DB subnet(s) 1230 of FIG. 12). The LB subnet(s) 1322 contained in the control plane DMZ tier 1320 can be communicatively coupled to the app subnet(s) 1326 contained in the control plane app tier 1324 and an Internet gateway 1334 (e.g. the Internet gateway 1234 of FIG. 12) that can be contained in the control plane VCN 1316, and the app subnet(s) 1326 can be communicatively coupled to the DB subnet(s) 1330 contained in the control plane data tier 1328 and a service gateway 1336 (e.g. the service gateway of FIG. 12) and a network address translation (NAT) gateway 1338 (e.g. the NAT gateway 1238 of FIG. 12). The control plane VCN 1316 can include the service gateway 1336 and the NAT gateway 1338.

The control plane VCN 1316 can include a data plane mirror app tier 1340 (e.g. the data plane mirror app tier 1240 of FIG. 12) that can include app subnet(s) 1326. The app subnet(s) 1326 contained in the data plane mirror app tier 1340 can include a virtual network interface controller (VNIC) 1342 (e.g. the VNIC of 1242) that can execute a compute instance 1344 (e.g. similar to the compute instance 1244 of FIG. 12). The compute instance 1344 can facilitate communication between the app subnet(s) 1326 of the data plane mirror app tier 1340 and the app subnet(s) 1326 that can be contained in a data plane app tier 1346 (e.g. the data plane app tier 1246 of FIG. 12) via the VNIC 1342 contained in the data plane mirror app tier 1340 and the VNIC 1342 contained in the data plan app tier 1346.

The Internet gateway 1334 contained in the control plane VCN 1316 can be communicatively coupled to a metadata management service 1352 (e.g. the metadata management service 1252 of FIG. 12) that can be communicatively coupled to public Internet 1354 (e.g. public Internet 1254 of FIG. 12). Public Internet 1354 can be communicatively coupled to the NAT gateway 1338 contained in the control plane VCN 1316. The service gateway 1336 contained in the control plane VCN 1316 can be communicatively couple to cloud services 1356 (e.g. cloud services 1256 of FIG. 12).

In some examples, the data plane VCN 1318 can be contained in the customer tenancy 1321. In this case, the IaaS provider may provide the control plane VCN 1316 for each customer, and the IaaS provider may, for each customer, set up a unique compute instance 1344 that is contained in the service tenancy 1319. Each compute instance 1344 may allow communication between the control plane VCN 1316, contained in the service tenancy 1319, and the data plane VCN 1318 that is contained in the customer tenancy 1321. The compute instance 1344 may allow resources, that are provisioned in the control plane VCN 1316 that is contained in the service tenancy 1319, to be deployed or otherwise used in the data plane VCN 1318 that is contained in the customer tenancy 1321.

In other examples, the customer of the IaaS provider may have databases that live in the customer tenancy 1321. In this example, the control plane VCN 1316 can include the data plane mirror app tier 1340 that can include app subnet(s) 1326. The data plane mirror app tier 1340 can reside in the data plane VCN 1318, but the data plane mirror app tier 1340 may not live in the data plane VCN 1318. That is, the data plane mirror app tier 1340 may have access to the customer tenancy 1321, but the data plane mirror app tier 1340 may not exist in the data plane VCN 1318 or be owned or operated by the customer of the IaaS provider. The data plane mirror app tier 1340 may be configured to make calls to the data plane VCN 1318 but may not be configured to make calls to any entity contained in the control plane VCN 1316. The customer may desire to deploy or otherwise use resources in the data plane VCN 1318 that are provisioned in the control plane VCN 1316, and the data plane mirror app tier 1340 can facilitate the desired deployment, or other usage of resources, of the customer.

In some embodiments, the customer of the IaaS provider can apply filters to the data plane VCN 1318. In this embodiment, the customer can determine what the data plane VCN 1318 can access, and the customer may restrict access to public Internet 1354 from the data plane VCN 1318. The IaaS provider may not be able to apply filters or otherwise control access of the data plane VCN 1318 to any outside networks or databases. Applying filters and controls by the customer onto the data plane VCN 1318, contained in the customer tenancy 1321, can help isolate the data plane VCN 1318 from other customers and from public Internet 1354.

In some embodiments, cloud services 1356 can be called by the service gateway 1336 to access services that may not exist on public Internet 1354, on the control plane VCN 1316, or on the data plane VCN 1318. The connection between cloud services 1356 and the control plane VCN 1316 or the data plane VCN 1318 may not be live or continuous. Cloud services 1356 may exist on a different network owned or operated by the IaaS provider. Cloud services 1356 may be configured to receive calls from the service gateway 1336 and may be configured to not receive calls from public Internet 1354. Some cloud services 1356 may be isolated from other cloud services 1356, and the control plane VCN 1316 may be isolated from cloud services 1356 that may not be in the same region as the control plane VCN 1316. For example, the control plane VCN 1316 may be located in "Region 1," and cloud service "Deployment 12," may be located in Region 1 and in "Region 2." If a call to Deployment 12 is made by the service gateway 1336 contained in the control plane VCN 1316 located in Region 1, the call may be transmitted to Deployment 12 in Region 1. In this example, the control plane VCN 1316, or Deployment 12 in Region 1, may not be communicatively coupled to, or otherwise in communication with, Deployment 12 in Region 2.

Figure 14:
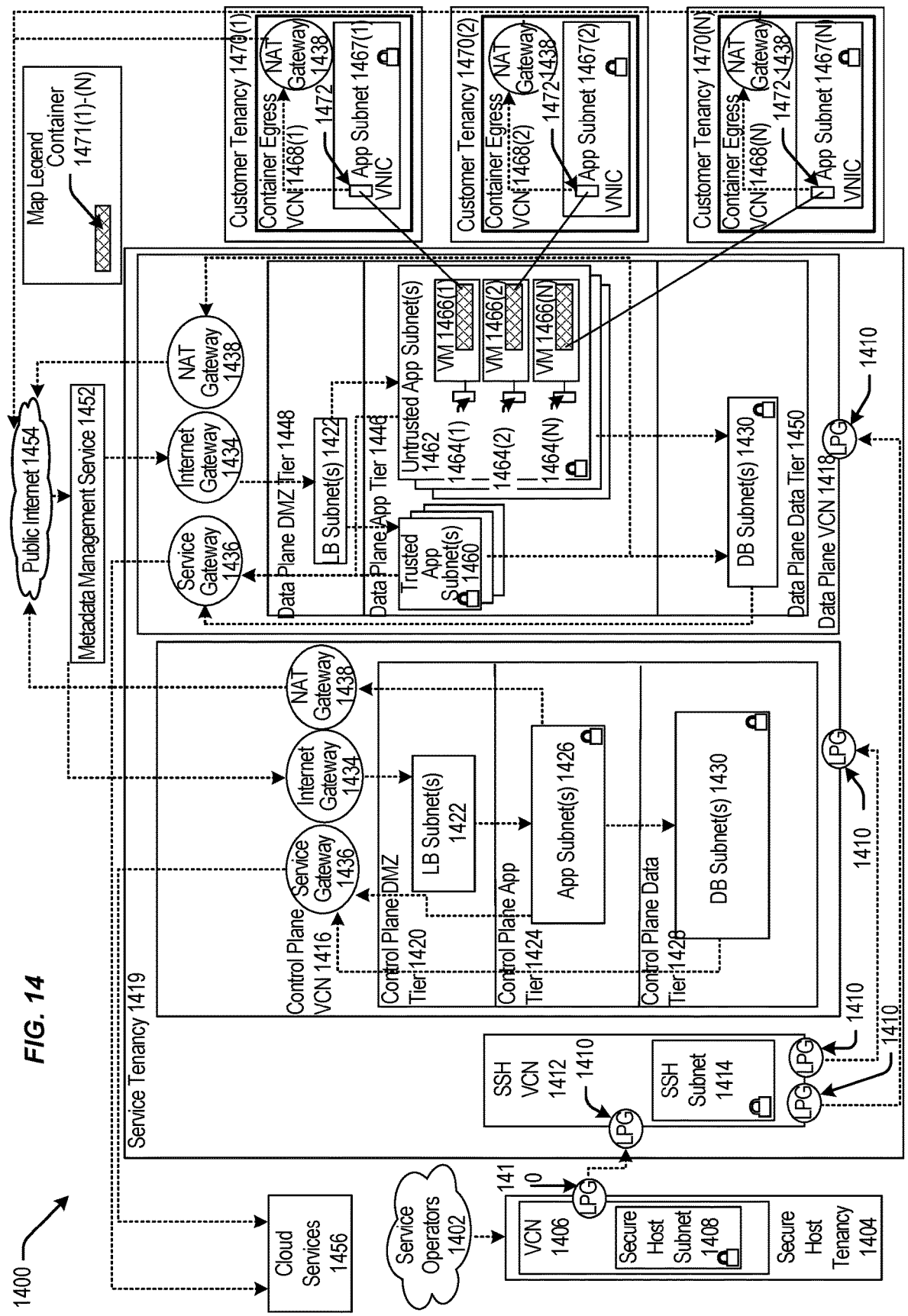
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g. service operators 1202 of FIG. 12) can be communicatively coupled to a secure host tenancy 1404 (e.g. the secure host tenancy 1204 of FIG. 12) that can include a virtual cloud network (VCN) 1406 (e.g. the VCN 1206 of FIG. 12) and a secure host subnet 1408 (e.g. the secure host subnet 1208 of FIG. 12). The VCN 1406 can include an LPG 1410 (e.g. the LPG 1210 of FIG. 12) that can be communicatively coupled to an SSH VCN 1412 (e.g. the SSH VCN 1212 of FIG. 12) via an LPG 1410 contained in the SSH VCN 1412. The SSH VCN 1412 can include an SSH subnet 1414 (e.g. the SSH subnet 1214 of FIG. 12), and the SSH VCN 1412 can be communicatively coupled to a control plane VCN 1416 (e.g. the control plane VCN 1216 of FIG. 12) via an LPG 1410 contained in the control plane VCN 1416 and to a data plane VCN 1418 (e.g. the data plane 1218 of FIG. 12) via an LPG 1410 contained in the data plane VCN 1418. The control plane VCN 1416 and the data plane VCN 1418 can be contained in a service tenancy 1419 (e.g. the service tenancy 1219 of FIG. 12).

The control plane VCN 1416 can include a control plane DMZ tier 1420 (e.g. the control plane DMZ tier 1220 of FIG. 12) that can include load balancer (LB) subnet(s) 1422 (e.g. LB subnet(s) 1222 of FIG. 12), a control plane app tier 1424 (e.g. the control plane app tier 1224 of FIG. 12) that can include app subnet(s) 1426 (e.g. similar to app subnet(s) 1226 of FIG. 12), a control plane data tier 1428 (e.g. the control plane data tier 1228 of FIG. 12) that can include DB subnet(s) 1430. The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1234 of FIG. 12) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 12) and a network address translation (NAT) gateway 1438 (e.g. the NAT gateway 1238 of FIG. 12). The control plane VCN 1416 can include the service gateway 1436 and the NAT gateway 1438.

The data plane VCN 1418 can include a data plane app tier 1446 (e.g. the data plane app tier 1246 of FIG. 12), a data plane DMZ tier 1448 (e.g. the data plane DMZ tier 1248 of FIG. 12), and a data plane data tier 1450 (e.g. the data plane data tier 1250 of FIG. 12). The data plane DMZ tier 1448 can include LB subnet(s) 1422 that can be communicatively coupled to trusted app subnet(s) 1460 and untrusted app subnet(s) 1462 of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include one or more primary VNICs 1464(1)-(N) that can be communicatively coupled to tenant virtual machines (VMs) 1466(1)-(N). Each tenant VM 1466(1)-(N) can be communicatively coupled to a respective app subnet 1467(1)-(N) that can be contained in respective container egress VCNs 1468(1)-(N) that can be contained in respective customer tenancies 1470(1)-(N). Respective secondary VNICs 1472(1)-(N) can facilitate communication between the untrusted app subnet(s) 1462 contained in the data plane VCN 1418 and the app subnet contained in the container egress VCNs 1468(1)-(N). Each container egress VCNs 1468(1)-(N) can include a NAT gateway 1438 that can be communicatively coupled to public Internet 1454 (e.g. public Internet 1254 of FIG. 12).

The Internet gateway 1434 contained in the control plane VCN 1416 and contained in the data plane VCN 1418 can be communicatively coupled to a metadata management service 1452 (e.g. the metadata management system 1252 of FIG. 12) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some embodiments, the data plane VCN 1418 can be integrated with customer tenancies 1470. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1446. Code to run the function may be executed in the VMs 1466(1)-(N), and the code may not be configured to run anywhere else on the data plane VCN 1418. Each VM 1466(1)-(N) may be connected to one customer tenancy 1470. Respective containers 1471(1)-(N) contained in the VMs 1466(1)-(N) may be configured to run the code. In this case, there can be a dual isolation (e.g., the containers 1471(1)-(N) running code, where the containers 1471(1)-(N) may be contained in at least the VM 1466(1)-(N) that are contained in the untrusted app subnet(s) 1462), which may help prevent incorrect or otherwise undesirable code from damaging the network of the IaaS provider or from damaging a network of a different customer. The containers 1471(1)-(N) may be communicatively coupled to the customer tenancy 1470 and may be configured to transmit or receive data from the customer tenancy 1470. The containers 1471(1)-(N) may not be configured to transmit or receive data from any other entity in the data plane VCN 1418. Upon completion of running the code, the IaaS provider may kill or otherwise dispose of the containers 1471(1)-(N).

In some embodiments, the trusted app subnet(s) 1460 may run code that may be owned or operated by the IaaS provider. In this embodiment, the trusted app subnet(s) 1460 may be communicatively coupled to the DB subnet(s) 1430 and be configured to execute CRUD operations in the DB subnet(s) 1430. The untrusted app subnet(s) 1462 may be communicatively coupled to the DB subnet(s) 1430, but in this embodiment, the untrusted app subnet(s) may be configured to execute read operations in the DB subnet(s) 1430. The containers 1471(1)-(N) that can be contained in the VM 1466(1)-(N) of each customer and that may run code from the customer may not be communicatively coupled with the DB subnet(s) 1430.

In other embodiments, the control plane VCN 1416 and the data plane VCN 1418 may not be directly communicatively coupled. In this embodiment, there may be no direct communication between the control plane VCN 1416 and the data plane VCN 1418. However, communication can occur indirectly through at least one method. An LPG 1410 may be established by the IaaS provider that can facilitate communication between the control plane VCN 1416 and the data plane VCN 1418. In another example, the control plane VCN 1416 or the data plane VCN 1418 can make a call to cloud services 1456 via the service gateway 1436. For example, a call to cloud services 1456 from the control plane VCN 1416 can include a request for a service that can communicate with the data plane VCN 1418.

Figure 15:
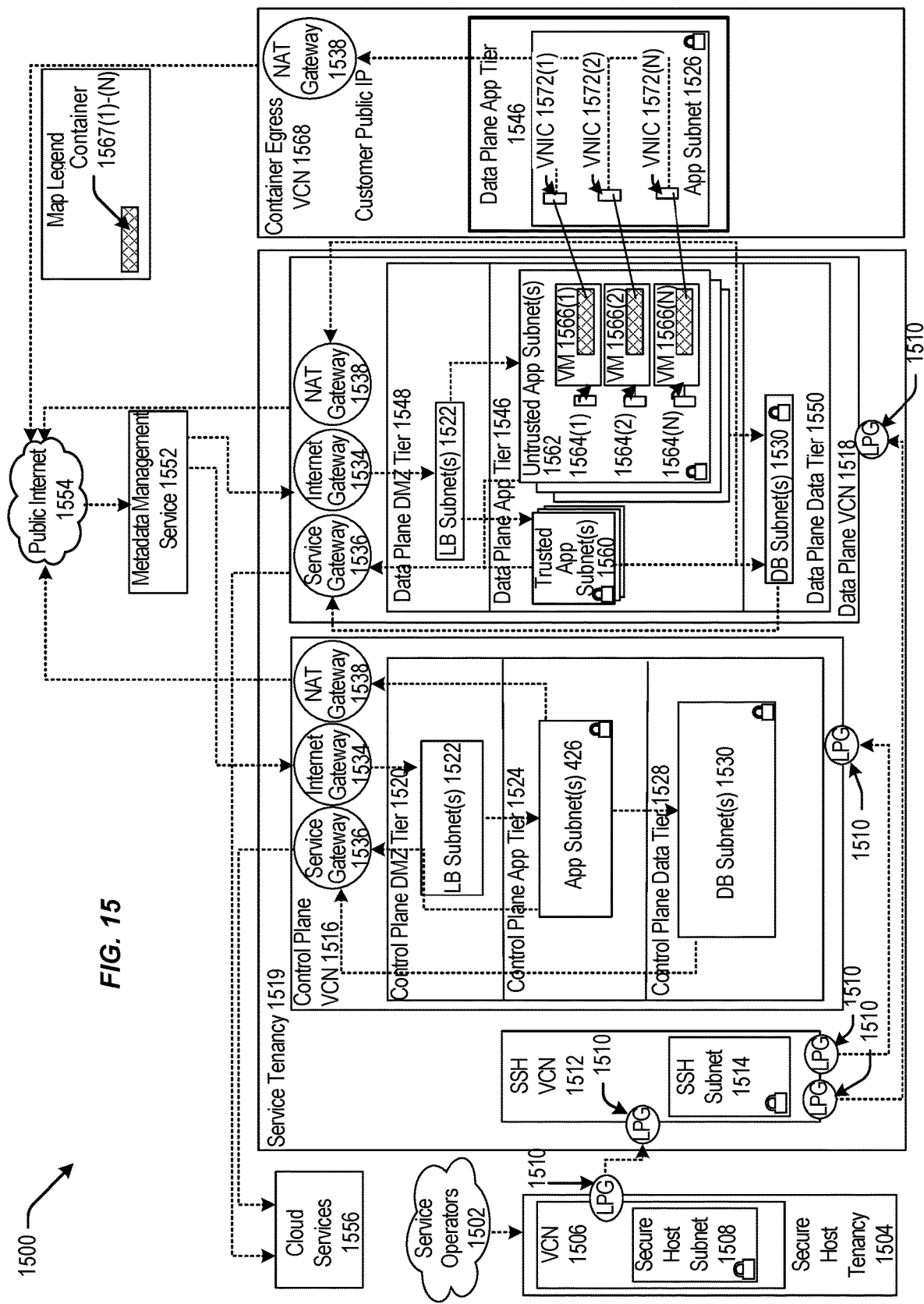
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g. service operators 1202 of FIG. 12) can be communicatively coupled to a secure host tenancy 1504 (e.g. the secure host tenancy 1204 of FIG. 12) that can include a virtual cloud network (VCN) 1506 (e.g. the VCN 1206 of FIG. 12) and a secure host subnet 1508 (e.g. the secure host subnet 1208 of FIG. 12). The VCN 1506 can include an LPG 1510 (e.g. the LPG 1210 of FIG. 12) that can be communicatively coupled to an SSH VCN 1512 (e.g. the SSH VCN 1212 of FIG. 12) via an LPG 1510 contained in the SSH VCN 1512. The SSH VCN 1512 can include an SSH subnet 1514 (e.g. the SSH subnet 1214 of FIG. 12), and the SSH VCN 1512 can be communicatively coupled to a control plane VCN 1516 (e.g. the control plane VCN 1216 of FIG. 12) via an LPG 1510 contained in the control plane VCN 1516 and to a data plane VCN 1518 (e.g. the data plane 1218 of FIG. 12) via an LPG 1510 contained in the data plane VCN 1518. The control plane VCN 1516 and the data plane VCN 1518 can be contained in a service tenancy 1519 (e.g. the service tenancy 1219 of FIG. 12).

The control plane VCN 1516 can include a control plane DMZ tier 1520 (e.g. the control plane DMZ tier 1220 of FIG. 12) that can include LB subnet(s) 1522 (e.g. LB subnet(s) 1222 of FIG. 12), a control plane app tier 1524 (e.g. the control plane app tier 1224 of FIG. 12) that can include app subnet(s) 1526 (e.g. app subnet(s) 1226 of FIG. 12), a control plane data tier 1528 (e.g. the control plane data tier 1228 of FIG. 12) that can include DB subnet(s) 1530 (e.g. DB subnet(s) 1430 of FIG. 14). The LB subnet(s) 1522 contained in the control plane DMZ tier 1520 can be communicatively coupled to the app subnet(s) 1526 contained in the control plane app tier 1524 and to an Internet gateway 1534 (e.g. the Internet gateway 1234 of FIG. 12) that can be contained in the control plane VCN 1516, and the app subnet(s) 1526 can be communicatively coupled to the DB subnet(s) 1530 contained in the control plane data tier 1528 and to a service gateway 1536 (e.g. the service gateway of FIG. 12) and a network address translation (NAT) gateway 1538 (e.g. the NAT gateway 1238 of FIG. 12). The control plane VCN 1516 can include the service gateway 1536 and the NAT gateway 1538.

The data plane VCN 1518 can include a data plane app tier 1546 (e.g. the data plane app tier 1246 of FIG. 12), a data plane DMZ tier 1548 (e.g. the data plane DMZ tier 1248 of FIG. 12), and a data plane data tier 1550 (e.g. the data plane data tier 1250 of FIG. 12). The data plane DMZ tier 1548 can include LB subnet(s) 1522 that can be communicatively coupled to trusted app subnet(s) 1560 (e.g. trusted app subnet(s) 1460 of FIG. 14) and untrusted app subnet(s) 1562 (e.g. untrusted app subnet(s) 1462 of FIG. 14) of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include primary VNICs 1564(1)-(N) that can be communicatively coupled to tenant virtual machines (VMs) 1566(1)-(N) residing within the untrusted app subnet(s) 1562. Each tenant VM 1566(1)-(N) can run code in a respective container 1567(1)-(N), and be communicatively coupled to an app subnet 1526 that can be contained in a data plane app tier 1546 that can be contained in a container egress VCN 1568. Respective secondary VNICs 1572(1)-(N) can facilitate communication between the untrusted app subnet(s) 1562 contained in the data plane VCN 1518 and the app subnet contained in the container egress VCN 1568. The container egress VCN can include a NAT gateway 1538 that can be communicatively coupled to public Internet 1554 (e.g. public Internet 1254 of FIG. 12).

The Internet gateway 1534 contained in the control plane VCN 1516 and contained in the data plane VCN 1518 can be communicatively coupled to a metadata management service 1552 (e.g. the metadata management system 1252 of FIG. 12) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some examples, the pattern illustrated by the architecture of block diagram 1500 of FIG. 15 may be considered an exception to the pattern illustrated by the architecture of block diagram 1400 of FIG. 14 and may be desirable for a customer of the IaaS provider if the IaaS provider cannot directly communicate with the customer (e.g., a disconnected region). The respective containers 1567(1)-(N) that are contained in the VMs 1566(1)-(N) for each customer can be accessed in real-time by the customer. The containers 1567(1)-(N) may be configured to make calls to respective secondary VNICs 1572(1)-(N) contained in app subnet(s) 1526 of the data plane app tier 1546 that can be contained in the container egress VCN 1568. The secondary VNICs 1572(1)-(N) can transmit the calls to the NAT gateway 1538 that may transmit the calls to public Internet 1554. In this example, the containers 1567(1)-(N) that can be accessed in real-time by the customer can be isolated from the control plane VCN 1516 and can be isolated from other entities contained in the data plane VCN 1518. The containers 1567(1)-(N) may also be isolated from resources from other customers.

In other examples, the customer can use the containers 1567(1)-(N) to call cloud services 1556. In this example, the customer may run code in the containers 1567(1)-(N) that requests a service from cloud services 1556. The containers 1567(1)-(N) can transmit this request to the secondary VNICs 1572(1)-(N) that can transmit the request to the NAT gateway that can transmit the request to public Internet 1554. Public Internet 1554 can transmit the request to LB subnet(s) 1522 contained in the control plane VCN 1516 via the Internet gateway 1534. In response to determining the request is valid, the LB subnet(s) can transmit the request to app subnet(s) 1526 that can transmit the request to cloud services 1556 via the service gateway 1536.

It should be appreciated that IaaS architectures 1200, 1300, 1400, 1500 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 16:
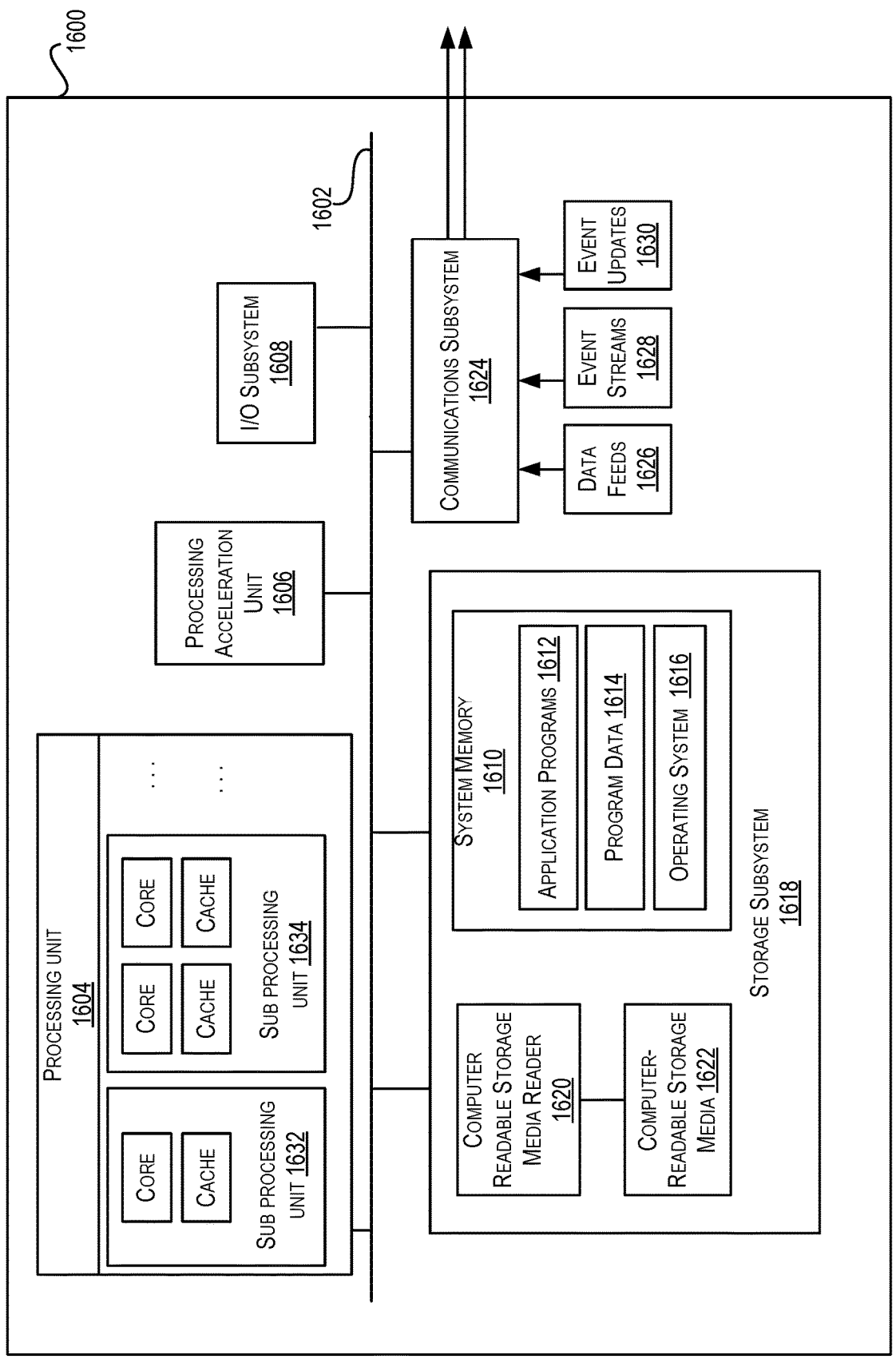
FIG. 16 is a block diagram illustrating an example computer system, according to at least one embodiment.

FIG. 16 illustrates an example computer system 1600, in which various embodiments of the present disclosure may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1604. In some implementations, system memory 1610 may include multiple different types of memory, such as static random access memory (SRAM) or dynamic random access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 16 OS, and Palm® OS operating systems.

Storage subsystem 1618 may also provide a tangible computer-readable storage medium for storing the basic programming and data constructs that provide the functionality of some embodiments. Software (programs, code modules, instructions) that when executed by a processor provide the functionality described above may be stored in storage subsystem 1618. These software modules or instructions may be executed by processing unit 1604. Storage subsystem 1618 may also provide a repository for storing data used in accordance with the present disclosure.

Storage subsystem 1600 may also include a computer-readable storage media reader 1620 that can further be connected to computer-readable storage media 1622. Together and, optionally, in combination with system memory 1610, computer-readable storage media 1622 may comprehensively represent remote, local, fixed, and/or removable storage devices plus storage media for temporarily and/or more permanently containing, storing, transmitting, and retrieving computer-readable information.

Computer-readable storage media 1622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1600.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   monitoring, by a software service, health assessment data corresponding to a plurality of computing instances of a distributed computing environment, the plurality of computing instances comprising a network load balancing computing instance configured to manage workflow to a subset of the plurality of computing instances, the health assessment data being provided, at least in part, by a health assessment application selected from a plurality of health assessment applications to probe the plurality of computing instances for the health assessment data, the health assessment application being selected based at least in part on an estimated resource consumption for obtaining the health assessment data and an available compute resource capacity of a computing component hosting a particular health assessment application;
   receiving, by the software service, a request for first collective health assessment data of the plurality of computing instances;
   providing, by the software service, the first collective health assessment data in response to the request, the first collective health assessment data being obtained from a first distributed cache, the first collective health assessment data comprising the health assessment data provided by the health assessment application;
   storing the first collective health assessment data in a second distributed cache as stored health assessment data;
   receiving, by the software service, a subsequent request for second collective health assessment data for the plurality of computing instances;
   obtaining, from the second distributed cache, the second collective health assessment data corresponding to the plurality of computing instances;
   calculating, by the software service, change data indicative of a difference between the first collective health assessment data and the second collective health assessment data; and
   providing, by the software service, the change data in response to the subsequent request.

2. The computer-implemented method of claim 1, further comprising providing, by the software service to the network load balancing computing instance, particular health assessment data corresponding to the subset of the plurality of computing instances to which the network load balancing computing instance is assigned load balancing responsibilities, wherein providing the particular health assessment data corresponding to the subset of the plurality of computing instances configures the network load balancing computing instance to balance workloads distributed to the subset of the plurality of computing instances based at least in part on the particular health assessment data provided by the software service.

3. The computer-implemented method of claim 1, wherein the health assessment application is a first health assessment application associated with the network load balancing computing instance and a first availability domain, and wherein additional health assessment data is obtained by a second health assessment application associated with the network load balancing computing instance and a second availability domain.

4. The computer-implemented method of claim 1, wherein the health assessment application executes as part of the network load balancing computing instance.

5. The computer-implemented method of claim 1, wherein the network load balancing computing instance is configured to execute two or more health assessment applications, each corresponding to a different availability domain.

6. The computer-implemented method of claim 1, further comprising:
   obtaining, from the health assessment application, second health assessment data corresponding to the plurality of computing instances;
   computing the second collective health assessment data based at least in part on the second health assessment data; and
   updating the stored health assessment data within the second distributed cache based at least in part on the second health assessment data obtained from the health assessment application.

7. A distributed computing system, comprising:
   a plurality of computing instances comprising at least one network load balancing computing instance configured to manage workflow to a subset of the plurality of computing instances;
   a plurality of health assessment applications configured to obtain corresponding health assessment data from respective subsets of the plurality of computing instances;
   a first distributed cache;
   a second distributed cache; and
   a software service configured to:
      monitor health assessment data corresponding to the plurality of computing instances, the health assessment data being provided, at least in part, by a health assessment application selected from the plurality of health assessment applications to probe the plurality of computing instances, the health assessment application being selected based at least in part on an estimated resource consumption for obtaining the health assessment data and an available compute resource capacity of a computing component hosting a particular health assessment application;

receive a request for first collective health assessment data of the plurality of computing instances;

provide the first collective health assessment data in response to the request, the first collective health assessment data being obtained from the first distributed cache, the first collective health assessment data comprising the health assessment data provided by the health assessment application;

store the first collective health assessment data in the second distributed cache as stored health assessment data;

receive a subsequent request for second collective health assessment data for the plurality of computing instances;

obtain the second collective health assessment data corresponding to the plurality of computing instances;

calculate change data indicative of a difference between the first collective health assessment data and the second collective health assessment data; and provide the change data in response to the subsequent request.

8. The distributed computing system of claim 7, wherein the software service is further configured to provide, to the network load balancing computing instance, particular health assessment data corresponding to the subset of the plurality of computing instances to which the network load balancing computing instance is assigned load balancing responsibilities, wherein providing the particular health assessment data corresponding to the subset of the plurality of computing instances configures the network load balancing computing instance to balance workloads distributed to the subset of the plurality of computing instances based at least in part on the particular health assessment data provided by the software service.

9. The distributed computing system of claim 7, wherein the health assessment application is a first health assessment application associated with the network load balancing computing instance and a first availability domain, and wherein additional health assessment data is obtained by a second health assessment application associated with the network load balancing computing instance and a second availability domain.

10. The distributed computing system of claim 7, wherein the health assessment application executes as part of the network load balancing computing instance.

11. The distributed computing system of claim 7, wherein the network load balancing computing instance is configured to execute two or more health assessment applications, each corresponding to a different availability domain.

12. The distributed computing system of claim 7, wherein the software service is further configured to:

obtain, from the health assessment application, second health assessment data corresponding to the plurality of computing instances;

compute the second collective health assessment data based at least in part on the second health assessment data; and update the stored health assessment data within the second distributed cache based at least in part on the second health assessment data obtained from the health assessment application.

13. A non-transitory computer-readable storage medium comprising executable instructions that, when executed with one or more processors, cause a software service of a distributed computing environment to:

monitor health assessment data corresponding to a plurality of computing instances of the distributed computing environment, the plurality of computing instances comprising a network load balancing computing instance configured to manage workflow to a subset of the plurality of computing instances, the health assessment data being provided, at least in part, by a health assessment application selected from a plurality of health assessment applications to probe the plurality of computing instances, the health assessment application being selected based at least in part on an estimated resource consumption for obtaining the health assessment data and an available compute resource capacity of a computing component hosting a particular health assessment application;

receive a request for first collective health assessment data of the plurality of computing instances;

provide the first collective health assessment data in response to the request, the first collective health assessment data being obtained from a first distributed cache, the first collective health assessment data comprising the health assessment data provided by the health assessment application;

store the first collective health assessment data in a second distributed cache as stored health assessment data;

receive a subsequent request for second collective health assessment data for the plurality of computing instances;

obtain the second collective health assessment data corresponding to the plurality of computing instances;

calculate change data indicative of a difference between the first collective health assessment data and the second collective health assessment data; and provide the change data in response to the subsequent request.

14. The non-transitory computer-readable storage medium of claim 13, wherein executing the executable instructions further causes the software service to provide, to the network load balancing computing instance, particular health assessment data corresponding to the subset of the plurality of computing instances to which the network load balancing computing instance is assigned load balancing responsibilities, wherein providing the particular health assessment data corresponding to the subset of the plurality of computing instances configures the network load balancing computing instance to balance workloads distributed to the subset of the plurality of computing instances based at least in part on the particular health assessment data provided by the software service.

15. The non-transitory computer-readable storage medium of claim 13, wherein the health assessment application is a first health assessment application associated with the network load balancing computing instance and a first availability domain, and wherein additional health assessment data is obtained by a second health assessment application associated with the network load balancing computing instance and a second availability domain.

16. The non-transitory computer-readable storage medium of claim 13, wherein the health assessment application executes as part of the network load balancing computing instance.

17. The non-transitory computer-readable storage medium of claim 13, wherein the network load balancing computing instance is configured to execute two or more health assessment applications, each corresponding to a different availability domain.

* * * * *

UNITED STATES PATENT AND TRADEMARK OFFICE
CERTIFICATE OF CORRECTION

| | | |
|---|---|---|
| PATENT NO. | : 11,917,033 B2 | Page 1 of 1 |
| APPLICATION NO. | : 17/891529 | |
| DATED | : February 27, 2024 | |
| INVENTOR(S) | : Vinayakumar et al. | |

It is certified that error appears in the above-identified patent and that said Letters Patent is hereby corrected as shown below:

In the Specification

In Column 21, Line 10, delete "minor" and insert -- mirror --, therefor.

Signed and Sealed this
Twenty-third Day of July, 2024

Katherine Kelly Vidal
*Director of the United States Patent and Trademark Office*